United States Patent
Dinan

(10) Patent No.: US 9,949,265 B2
(45) Date of Patent: Apr. 17, 2018

(54) CONTROL CHANNEL IN A WIRELESS COMMUNICATION SYSTEM

(71) Applicant: Comcast Cable Communications, LLC, Philadelphia, PA (US)

(72) Inventor: Esmael Hejazi Dinan, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/887,408

(22) Filed: May 6, 2013

(65) Prior Publication Data

US 2013/0294369 A1 Nov. 7, 2013

Related U.S. Application Data

(60) Provisional application No. 61/642,472, filed on May 4, 2012.

(51) Int. Cl.
*H04W 4/00* (2009.01)
*H04W 72/04* (2009.01)
*H04L 5/00* (2006.01)

(52) U.S. Cl.
CPC ......... *H04W 72/0466* (2013.01); *H04L 5/001* (2013.01); *H04L 5/0044* (2013.01); *H04L 5/0048* (2013.01); *H04L 5/0053* (2013.01)

(58) Field of Classification Search
CPC .... H04B 7/0417; H04B 7/0456; H04B 7/063; H04B 7/0639; H04W 64/006
USPC ........................................ 370/329, 224, 260
See application file for complete search history.

(56) References Cited

U.S. PATENT DOCUMENTS

| | | | |
|---|---|---|---|
| 6,711,120 B1 | 3/2004 | Laroia et al. |
| 7,372,813 B1 | 5/2008 | Cimino et al. |
| 7,924,475 B2 | 4/2011 | Suzuki |
| 7,924,755 B2 | 4/2011 | Xu et al. |
| 8,009,760 B2 | 8/2011 | Ahn et al. |
| 8,019,017 B2 | 9/2011 | Ahn et al. |
| 8,238,475 B2 | 8/2012 | Malladi et al. |
| 8,245,092 B2 | 8/2012 | Kotecha et al. |
| 8,369,280 B2 | 2/2013 | Dinan |
| 8,422,455 B1 | 4/2013 | Dinan |
| 8,427,976 B1 | 4/2013 | Dinan |

(Continued)

FOREIGN PATENT DOCUMENTS

| WO | 2010053984 A2 | 5/2010 |
|---|---|---|
| WO | 2011052643 A1 | 5/2011 |

(Continued)

OTHER PUBLICATIONS

Response to European Office Action—EP 14200113.0—dated Jun. 11, 2015.

(Continued)

*Primary Examiner* — Khaled Kassim
*Assistant Examiner* — Berhanu Belete
(74) *Attorney, Agent, or Firm* — Banner & Witcoff, Ltd.

(57) ABSTRACT

A base station receives channel state information from a wireless device. The base station transmits to the wireless device one or more data packets on a data channel employing a first precoding matrix identifier. The base station transmits one or more control packets on a control channel to the wireless device employing a second precoding matrix.

48 Claims, 6 Drawing Sheets

(56) References Cited

U.S. PATENT DOCUMENTS

| | | | |
|---|---|---|---|
| 8,437,303 B2 | 5/2013 | Dinan | |
| 8,446,844 B1 | 5/2013 | Dinan | |
| 8,483,172 B1 | 7/2013 | Dinan | |
| 8,526,393 B1 | 9/2013 | Dinan | |
| 8,526,459 B2 | 9/2013 | Dinan | |
| 8,531,990 B1 | 9/2013 | Dinan | |
| 8,532,684 B2* | 9/2013 | Chien | H04B 15/00 370/310 |
| 8,571,056 B1 | 10/2013 | Dinan | |
| 8,576,794 B1 | 11/2013 | Dinan | |
| 8,582,527 B2 | 11/2013 | Dinan | |
| 8,614,983 B2 | 12/2013 | Classon et al. | |
| 8,626,104 B2 | 1/2014 | Huang et al. | |
| 8,626,218 B2 | 1/2014 | Wang | |
| 8,699,449 B2 | 4/2014 | Dinan | |
| 8,705,461 B2 | 4/2014 | Bala et al. | |
| 8,711,731 B1 | 4/2014 | Dinan | |
| 8,737,315 B2* | 5/2014 | Shiizaki | H04W 72/10 370/329 |
| 8,804,772 B2 | 8/2014 | Dinan | |
| 8,811,333 B2 | 8/2014 | Dinan | |
| 8,842,637 B2 | 9/2014 | Dinan | |
| 8,908,633 B2 | 12/2014 | Dinan | |
| 8,953,550 B2 | 2/2015 | Dinan | |
| 8,989,130 B2 | 3/2015 | Dinan | |
| 9,213,080 B2 | 12/2015 | Siomina et al. | |
| 9,220,105 B2* | 12/2015 | Dinan | H04W 36/0072 |
| 9,247,534 B2 | 1/2016 | Han et al. | |
| 9,729,370 B2* | 8/2017 | Cheng | H04L 27/2615 |
| 2004/0097867 A1 | 5/2004 | Fraser et al. | |
| 2005/0117536 A1 | 6/2005 | Cho et al. | |
| 2005/0220000 A1 | 10/2005 | Kim et al. | |
| 2005/0243793 A1* | 11/2005 | Kim | H04W 24/00 370/347 |
| 2008/0112308 A1 | 5/2008 | Cleveland | |
| 2008/0165832 A1 | 7/2008 | Fukuda et al. | |
| 2008/0287068 A1 | 11/2008 | Etemad | |
| 2008/0310540 A1 | 12/2008 | Tiirola et al. | |
| 2008/0316956 A1 | 12/2008 | Turanyi et al. | |
| 2008/0318528 A1 | 12/2008 | Hooli et al. | |
| 2009/0040956 A1 | 2/2009 | Shinoi | |
| 2009/0059844 A1* | 3/2009 | Ko | H04B 7/0413 370/328 |
| 2009/0109890 A1 | 4/2009 | Chow et al. | |
| 2009/0180435 A1* | 7/2009 | Sarkar | 370/330 |
| 2009/0219875 A1 | 9/2009 | Kwak et al. | |
| 2009/0238241 A1 | 9/2009 | Hooli et al. | |
| 2009/0252077 A1 | 10/2009 | Khandekar et al. | |
| 2009/0316656 A1 | 12/2009 | Zhao et al. | |
| 2010/0034163 A1 | 2/2010 | Damnjanovic et al. | |
| 2010/0120442 A1 | 5/2010 | Zhuang et al. | |
| 2010/0135257 A1 | 6/2010 | Higuchi et al. | |
| 2010/0227569 A1 | 9/2010 | Bala et al. | |
| 2010/0272017 A1 | 10/2010 | Terry et al. | |
| 2010/0272066 A1 | 10/2010 | Wang et al. | |
| 2010/0281323 A1 | 11/2010 | Wang et al. | |
| 2010/0316000 A1 | 12/2010 | Burbidge et al. | |
| 2010/0322190 A1 | 12/2010 | Satou et al. | |
| 2010/0323704 A1 | 12/2010 | Tailor et al. | |
| 2011/0026645 A1 | 2/2011 | Luo et al. | |
| 2011/0032839 A1* | 2/2011 | Chen | H04B 7/024 370/252 |
| 2011/0044391 A1 | 2/2011 | Ji et al. | |
| 2011/0064035 A1* | 3/2011 | Guerreiro | H04B 1/1027 370/329 |
| 2011/0065435 A1 | 3/2011 | Pancorbo Marcos et al. | |
| 2011/0075624 A1 | 3/2011 | Papasakellariou et al. | |
| 2011/0075640 A1 | 3/2011 | Mo et al. | |
| 2011/0075650 A1* | 3/2011 | Zhu | H04L 25/0246 370/344 |
| 2011/0085521 A1 | 4/2011 | Terry | |
| 2011/0085618 A1* | 4/2011 | Zhuang | H04L 25/021 375/296 |
| 2011/0103395 A1 | 5/2011 | Ratnakar et al. | |
| 2011/0116456 A1 | 5/2011 | Gaal et al. | |
| 2011/0141985 A1 | 6/2011 | Larsson et al. | |
| 2011/0149894 A1 | 6/2011 | Luo et al. | |
| 2011/0170489 A1 | 7/2011 | Han et al. | |
| 2011/0170496 A1 | 7/2011 | Fong et al. | |
| 2011/0199926 A1* | 8/2011 | Zheng | H04B 7/0452 370/252 |
| 2011/0200139 A1* | 8/2011 | Jen | H04B 7/0639 375/296 |
| 2011/0201323 A1 | 8/2011 | Wu et al. | |
| 2011/0216846 A1* | 9/2011 | Lee | H04B 7/0473 375/295 |
| 2011/0243090 A1* | 10/2011 | Grovlen | H04L 1/18 370/329 |
| 2011/0249578 A1 | 10/2011 | Nayeb Nazar et al. | |
| 2011/0249633 A1 | 10/2011 | Hong et al. | |
| 2011/0255629 A1* | 10/2011 | Ko | H04B 7/0413 375/285 |
| 2011/0261768 A1 | 10/2011 | Luo | |
| 2011/0261897 A1* | 10/2011 | Jen | H04B 7/0639 375/285 |
| 2011/0268062 A1 | 11/2011 | Ji et al. | |
| 2011/0268204 A1* | 11/2011 | Choi | H04B 7/0639 375/260 |
| 2011/0268207 A1* | 11/2011 | Choi | H04B 7/0456 375/267 |
| 2011/0274031 A1 | 11/2011 | Gaal et al. | |
| 2011/0274066 A1 | 11/2011 | Tee et al. | |
| 2011/0275359 A1 | 11/2011 | Sebire et al. | |
| 2011/0310823 A1 | 12/2011 | Nam et al. | |
| 2011/0319120 A1 | 12/2011 | Chen et al. | |
| 2012/0003945 A1* | 1/2012 | Liu | H04B 7/0639 455/115.1 |
| 2012/0008570 A1 | 1/2012 | Li et al. | |
| 2012/0039180 A1 | 2/2012 | Kim et al. | |
| 2012/0039199 A1 | 2/2012 | Chen et al. | |
| 2012/0039369 A1* | 2/2012 | Choi | H04B 7/0639 375/219 |
| 2012/0039402 A1* | 2/2012 | Clerckx | H04L 25/03343 375/259 |
| 2012/0044910 A1 | 2/2012 | Maeda et al. | |
| 2012/0045014 A1 | 2/2012 | Damnjanovic et al. | |
| 2012/0051257 A1* | 3/2012 | Kim | H04B 7/024 370/252 |
| 2012/0054258 A1 | 3/2012 | Li et al. | |
| 2012/0063302 A1 | 3/2012 | Damnjanovic et al. | |
| 2012/0087318 A1 | 4/2012 | Liu et al. | |
| 2012/0087424 A1* | 4/2012 | Brown | H04L 1/1887 375/260 |
| 2012/0088514 A1* | 4/2012 | Lee | H04B 7/0434 455/450 |
| 2012/0099466 A1 | 4/2012 | Aoyama et al. | |
| 2012/0106465 A1 | 5/2012 | Haghighat et al. | |
| 2012/0121031 A1* | 5/2012 | Tang | H04B 7/0691 375/267 |
| 2012/0122440 A1 | 5/2012 | Krishnamurthy et al. | |
| 2012/0127938 A1 | 5/2012 | Lv et al. | |
| 2012/0128088 A1* | 5/2012 | Ko et al. | 375/260 |
| 2012/0157140 A1* | 6/2012 | Kim | H04B 7/024 455/501 |
| 2012/0163250 A1 | 6/2012 | Chin et al. | |
| 2012/0182879 A1 | 7/2012 | Tamura et al. | |
| 2012/0207099 A1 | 8/2012 | Lindh et al. | |
| 2012/0213095 A1 | 8/2012 | Krishnamurthy et al. | |
| 2012/0213096 A1 | 8/2012 | Krishnamurthy et al. | |
| 2012/0213123 A1 | 8/2012 | Futaki | |
| 2012/0213261 A1* | 8/2012 | Sayana et al. | 375/224 |
| 2012/0218952 A1 | 8/2012 | Kwon et al. | |
| 2012/0236803 A1 | 9/2012 | Vujcic | |
| 2012/0250520 A1 | 10/2012 | Chen et al. | |
| 2012/0270591 A1* | 10/2012 | Sun | H04L 5/0035 455/522 |
| 2012/0275400 A1 | 11/2012 | Chen et al. | |
| 2012/0281556 A1* | 11/2012 | Sayana | H04B 7/024 370/252 |
| 2012/0281566 A1 | 11/2012 | Pelletier et al. | |
| 2012/0281646 A1 | 11/2012 | Liao et al. | |
| 2012/0287865 A1 | 11/2012 | Wu et al. | |

(56) References Cited

U.S. PATENT DOCUMENTS

| | | |
|---|---|---|
| 2012/0300718 A1 | 11/2012 | Ji et al. |
| 2012/0300728 A1* | 11/2012 | Lee .................. H04J 13/16 370/329 |
| 2012/0320846 A1 | 12/2012 | Papasakellariou et al. |
| 2013/0003604 A1 | 1/2013 | Blankenship et al. |
| 2013/0003639 A1 | 1/2013 | Noh et al. |
| 2013/0003663 A1 | 1/2013 | Blankenship et al. |
| 2013/0003672 A1 | 1/2013 | Dinan |
| 2013/0003673 A1 | 1/2013 | Dinan |
| 2013/0010715 A1 | 1/2013 | Dinan |
| 2013/0028236 A1 | 1/2013 | Jung et al. |
| 2013/0034070 A1* | 2/2013 | Seo .................. H04B 7/155 370/329 |
| 2013/0039188 A1 | 2/2013 | Larsson et al. |
| 2013/0039284 A1 | 2/2013 | Marinier et al. |
| 2013/0044693 A1 | 2/2013 | Lindh et al. |
| 2013/0064128 A1* | 3/2013 | Li .................. H04L 1/0026 370/252 |
| 2013/0083753 A1 | 4/2013 | Lee et al. |
| 2013/0089078 A1* | 4/2013 | Liu .................. H04L 1/1819 370/335 |
| 2013/0094464 A1* | 4/2013 | Li .................. H04L 5/0035 370/329 |
| 2013/0100888 A1* | 4/2013 | Shimezawa .......... H04L 5/0053 370/328 |
| 2013/0100921 A1 | 4/2013 | Nakao et al. |
| 2013/0107835 A1* | 5/2013 | Aiba et al. .................. 370/329 |
| 2013/0107861 A1* | 5/2013 | Cheng .................. H04W 72/042 370/331 |
| 2013/0114419 A1 | 5/2013 | Chen et al. |
| 2013/0114425 A1* | 5/2013 | Sayana .................. H04B 7/024 370/252 |
| 2013/0114517 A1 | 5/2013 | Blankenship et al. |
| 2013/0114521 A1 | 5/2013 | Frenne et al. |
| 2013/0114529 A1 | 5/2013 | Chen et al. |
| 2013/0114542 A1 | 5/2013 | Dinan |
| 2013/0121267 A1 | 5/2013 | Koorapaty et al. |
| 2013/0121277 A1* | 5/2013 | To .................. H04B 7/0617 370/329 |
| 2013/0128857 A1 | 5/2013 | Nakao |
| 2013/0129018 A1* | 5/2013 | Ko .................. H04B 7/0478 375/296 |
| 2013/0136098 A1 | 5/2013 | Li et al. |
| 2013/0142064 A1 | 6/2013 | Dinan |
| 2013/0142141 A1 | 6/2013 | Dinan |
| 2013/0155897 A1* | 6/2013 | Ihm .................. H04B 7/024 370/252 |
| 2013/0155990 A1 | 6/2013 | Nishio et al. |
| 2013/0155996 A1 | 6/2013 | Horiuchi et al. |
| 2013/0156125 A1* | 6/2013 | Ko .................. H04B 7/0478 375/267 |
| 2013/0163551 A1 | 6/2013 | He et al. |
| 2013/0176936 A1 | 7/2013 | Takahashi et al. |
| 2013/0176974 A1 | 7/2013 | Dinan |
| 2013/0182627 A1 | 7/2013 | Lee et al. |
| 2013/0182654 A1 | 7/2013 | Hariharan et al. |
| 2013/0195020 A1 | 8/2013 | Frederiksen et al. |
| 2013/0195057 A1 | 8/2013 | Dinan |
| 2013/0195068 A1 | 8/2013 | Baker et al. |
| 2013/0215871 A1 | 8/2013 | Dinan |
| 2013/0223381 A1 | 8/2013 | Dinan |
| 2013/0230015 A1 | 9/2013 | Hoymann et al. |
| 2013/0235839 A1 | 9/2013 | Kim et al. |
| 2013/0242750 A1 | 9/2013 | Baker et al. |
| 2013/0242777 A1 | 9/2013 | Choi et al. |
| 2013/0242880 A1 | 9/2013 | Miao et al. |
| 2013/0250864 A1 | 9/2013 | Zhang et al. |
| 2013/0250882 A1 | 9/2013 | Dinan |
| 2013/0258987 A1 | 10/2013 | Chun et al. |
| 2013/0286997 A1 | 10/2013 | Davydov et al. |
| 2013/0294385 A1 | 11/2013 | Dinan |
| 2013/0301597 A1 | 11/2013 | Kim et al. |
| 2013/0308576 A1 | 11/2013 | Dinan |
| 2013/0315190 A1 | 11/2013 | Horiuchi et al. |
| 2013/0322382 A1 | 12/2013 | Dinan |
| 2013/0329612 A1 | 12/2013 | Seo et al. |
| 2013/0329686 A1 | 12/2013 | Kim et al. |
| 2014/0003379 A1 | 1/2014 | Kang et al. |
| 2014/0003385 A1 | 1/2014 | Dinan |
| 2014/0029577 A1 | 1/2014 | Dinan |
| 2014/0044084 A1 | 2/2014 | Lee et al. |
| 2014/0050192 A1 | 2/2014 | Kim et al. |
| 2014/0056244 A1* | 2/2014 | Frenne .................. H04L 5/0053 370/329 |
| 2014/0064235 A1 | 3/2014 | Seo et al. |
| 2014/0064240 A1 | 3/2014 | Dinan |
| 2014/0071952 A1 | 3/2014 | Kim et al. |
| 2014/0105150 A1 | 4/2014 | Kim et al. |
| 2014/0105155 A1 | 4/2014 | Kim et al. |
| 2014/0105156 A1 | 4/2014 | Jang et al. |
| 2014/0105165 A1 | 4/2014 | Dinan |
| 2014/0112280 A1 | 4/2014 | Lee et al. |
| 2014/0112283 A1 | 4/2014 | Kim et al. |
| 2014/0126487 A1 | 5/2014 | Chen et al. |
| 2014/0126505 A1 | 5/2014 | Chun et al. |
| 2014/0153515 A1* | 6/2014 | Chun .................. H04L 5/0007 370/329 |
| 2014/0177577 A1 | 6/2014 | Dinan |
| 2014/0177578 A1 | 6/2014 | Dinan |
| 2014/0177598 A1 | 6/2014 | Dinan |
| 2014/0192759 A1 | 7/2014 | Son et al. |
| 2014/0254410 A1 | 9/2014 | Seo et al. |
| 2014/0254420 A1 | 9/2014 | Kim et al. |
| 2014/0328315 A1 | 11/2014 | Dinan |
| 2015/0003381 A1 | 1/2015 | Dinan |
| 2015/0131609 A1 | 5/2015 | Dinan |
| 2016/0135156 A1 | 5/2016 | Lee et al. |

FOREIGN PATENT DOCUMENTS

| | | |
|---|---|---|
| WO | 2011085195 A1 | 7/2011 |
| WO | 2013140241 A1 | 9/2013 |
| WO | 2013167967 A2 | 11/2013 |

OTHER PUBLICATIONS

European Search Report—EP 14200113.0—dated Jul. 17, 2015.
3GPP TSG RAN WG1 #69 R1-122794, May 21-25, 2012, Prague, Czech Republic, Source: Qualcomm Incorporated. Title: Mapping of e-PDCCH in presence of other signals.
3GPP TSG RAN WG1 #68 R1-120267, Dresden, Germany Feb. 6-10, 2012, Source: HTC. Title: Search Space Design for E-PDCCH.
3GPP TSG RAN WG1 #68 R1-120507, Dresden, Germany, Feb. 6-10, 2012, Source: Alcatel-Lucent, Alcatel Lucent Shanghai Bell. Title: Further details of ePDCCH UE-specific search space design.
3GPP TSG RAN WG1 Meeting #68bis R1-121252, Jeju, Korea, Mar. 26-30, 2012, Source: Alcatel-Lucent Shanghai Bell, Alcatel-Lucent. Title: Search Space Design for ePDCCH.
3GPP TSG RAN WG1 Meeting #68bis R1-121354, Jeju, Korea, Mar. 26-30, 2012, Source: Sharp. Title: Common search space in ePDCCH.
3GPP TSG RAN WG1 #68bis R1-121644, Jeju, Korea, Mar. 26-30, 2012, Source: Samsung. Title: Support of Common Search Space Design for E-PDCCHs.
3GPP TSG RAN WG1 Meeting #69, R1-121977, Prague, Czech Republic, May 21-25, 2012, Source: NTT DOCOMO. Title: Views on Resource Mapping for ePDCCH.
3GPP TSG RAN WG1 #69 R1-122000, Prague, Czech Republic, May 21-25, 2012, Source: Ericsson, ST-Ericsson. Title: Mapping of ePDCCH to RE.
Ericsson: "Control plane aspects of carrier aggregation," 3GPP Draft; R2-092958, RAN WG2, Apr. 28, 2009, San Francisco, USA.
GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

(56) References Cited

OTHER PUBLICATIONS

3GPP TS 36.321 V10.0.0 (Dec. 2010), 3rd Generation Partnership Project; Technical Specification Group Radio Access Network; Evolved Universal Terrestrial Radio Access (E-UTRA); Medium Access Control (MAC) protocol specification (Release 10).
3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).
3GPP TSG RAN1 #65 R1-111471, Barcelona, Spain, May 9-13, 2011, Source: Samsung, Title: Discussion on Downlink Control Channel Enhancement.
Response to EP Office Action—EP App 14200113.0—Filed Feb. 17, 2016.
European Search Report—EP Appl. 15188352.7—dated Aug. 9, 2016.
European Office Action—EP App. 14200113.0—dated Sep. 30, 2016.

\* cited by examiner

CONTROL CHANNEL IN A WIRELESS COMMUNICATION SYSTEM

CROSS-REFERENCE TO RELATED APPLICATIONS

This application claims the benefit of U.S. Provisional Application No. 61/642,472, filed May 4, 2012, which is hereby incorporated by reference in its entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention disclose a control channel in a wireless communication system. Embodiments of the technology disclosed herein may be employed in the technical field of wireless communication systems. More particularly, the embodiments of the technology disclosed herein may relate to transmission of reception of a control channel in a wireless communication system.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
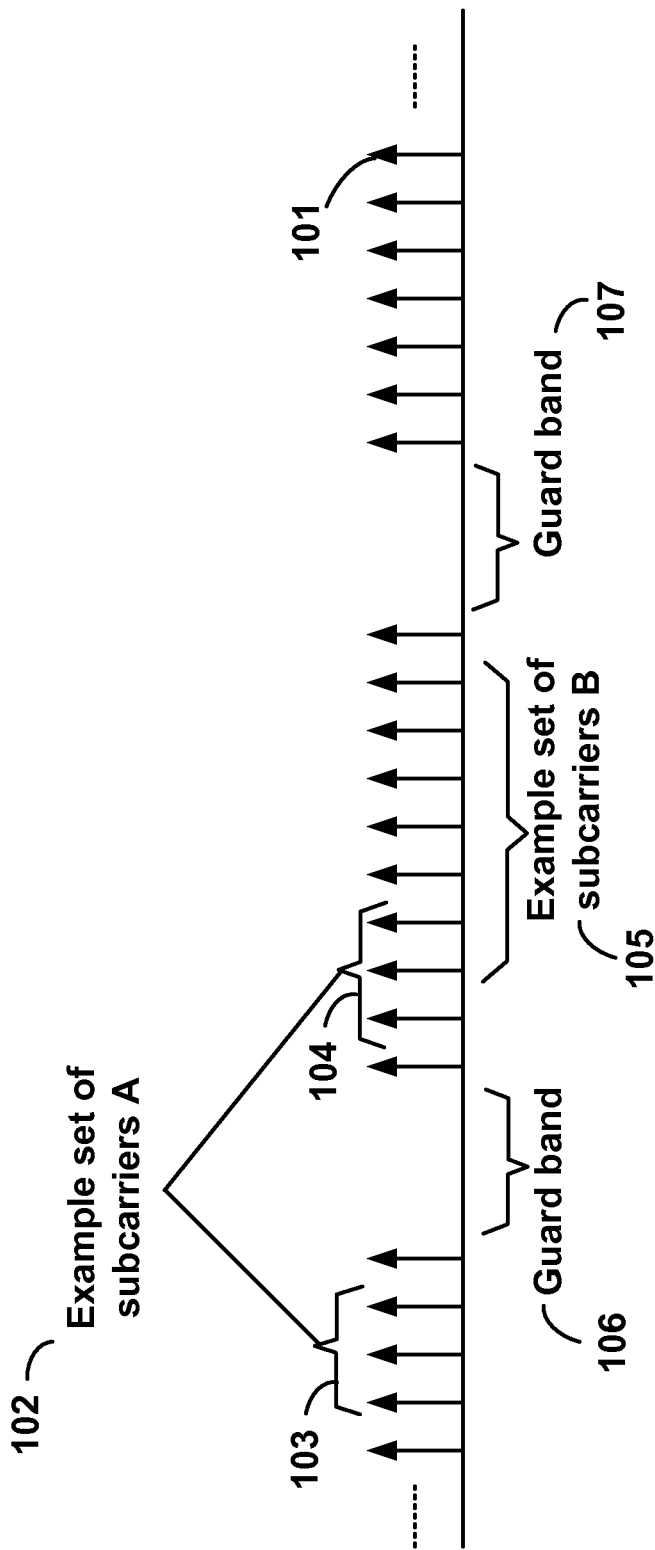
FIG. 1 is a diagram depicting example sets of OFDM subcarriers according to an exemplary embodiment.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
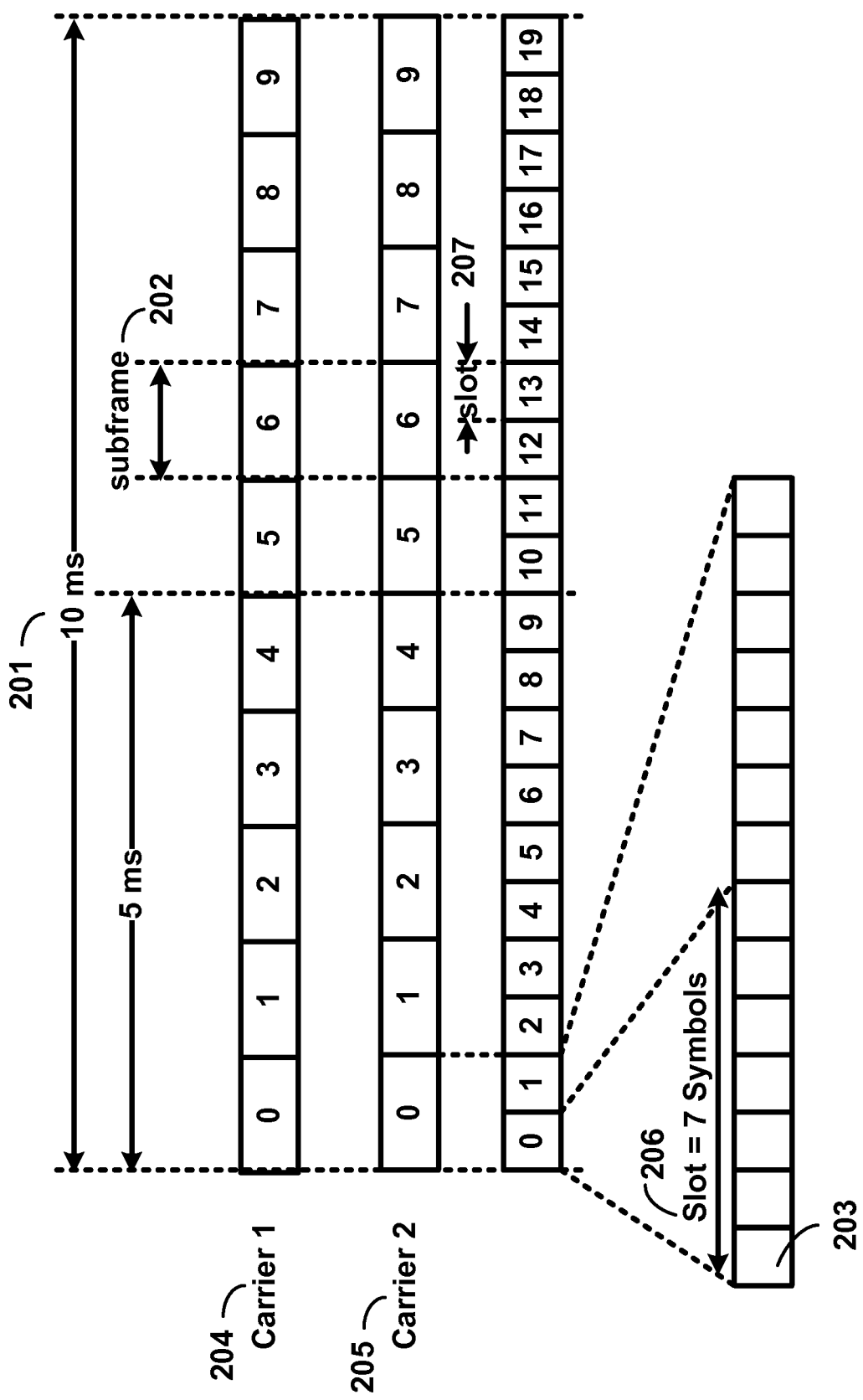
FIG. 2 is a diagram depicting an example transmission and reception time for two carriers, according to an exemplary embodiment.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other subframe durations such as including 0.5 msec, 1 msec, 2 msec, and 5 msec may also be supported. Sub-frame(s) may consist of two or more slots 206. For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 10 ms switch-point periodicity may be supported. In an example, subframe 1 in all configurations and subframe 6 in configurations with 5 ms switch-point periodicity may include DwPTS, GP and UpPTS. Subframe 6 in configurations with 10 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
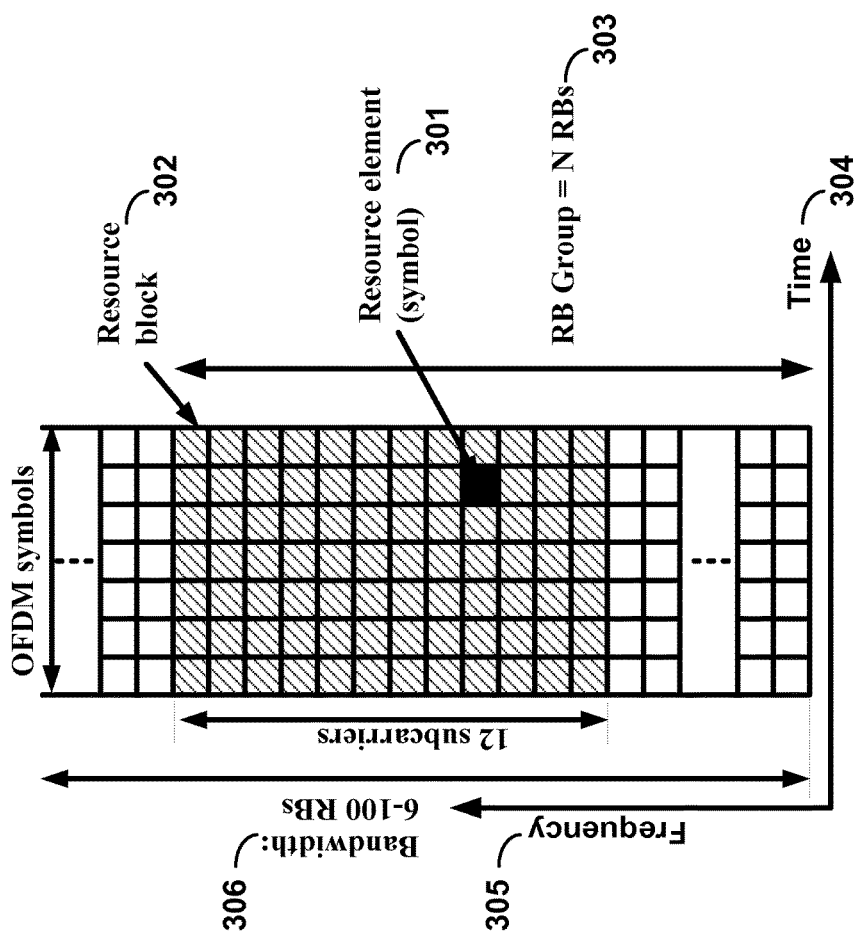
FIG. 3 is a diagram depicting OFDM radio resources according to an exemplary embodiment.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a predefined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, . . . , 18} and {15, . . . , 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
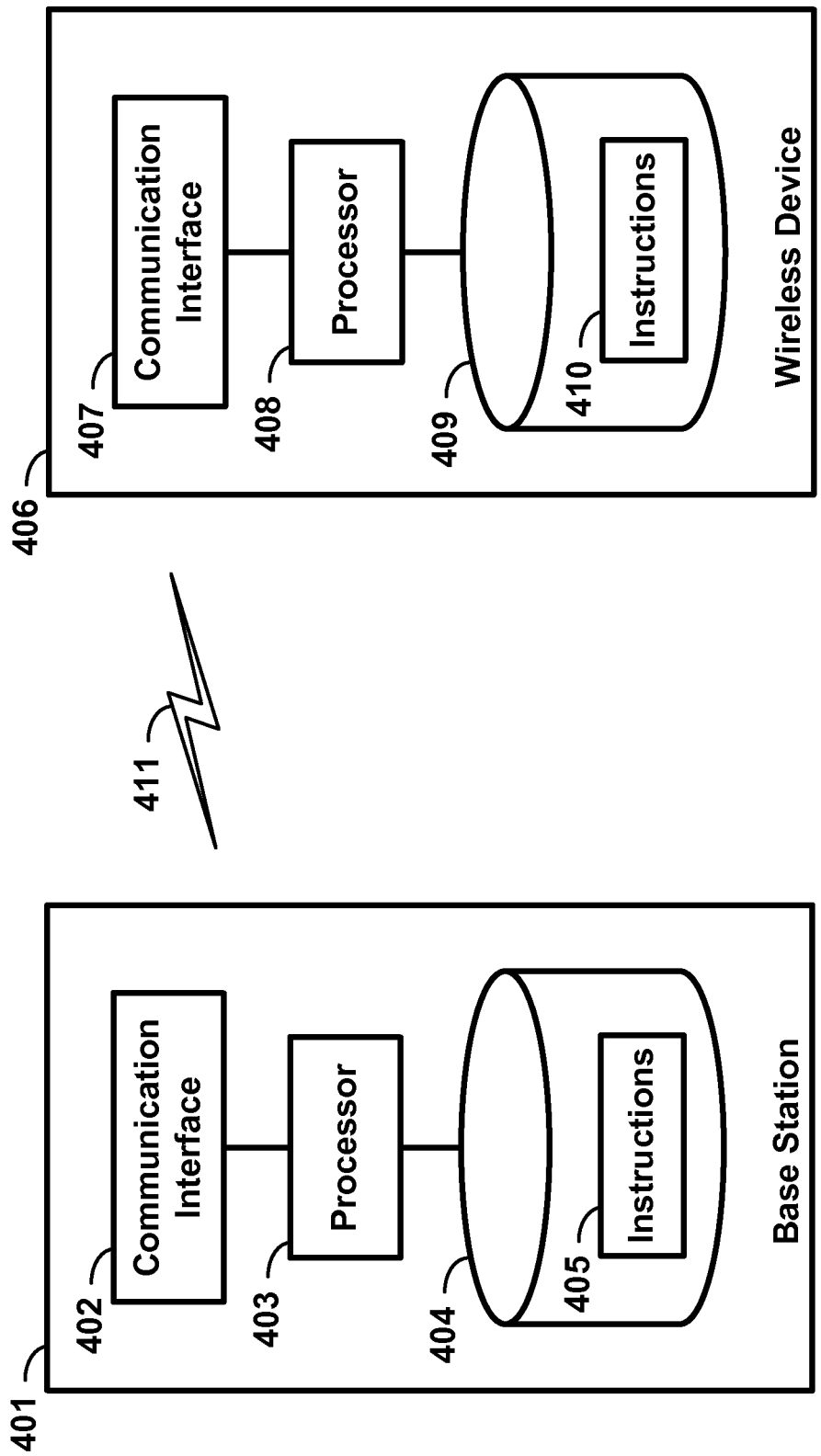
FIG. 4 is a block diagram of a base station and a wireless device, according to an exemplary embodiment.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may disclose a control channel. Other example embodiments may comprise a non-transitory tangible computer readable media comprising instructions executable by one or more processors to cause transmission and reception of a control channel. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to transmission and reception of a control channel. The device may include processors, memory, interfaces, and/or the like. Other example embodiments may comprise communication networks comprising devices such as base stations, wireless devices (or user equipment: UE), servers, switches, antennas, and/or the like.

According to some of the various aspects of embodiments, a base station may receive a first radio resource control (RRC) message from a wireless device (UE). The first message may be received on a primary carrier (uplink) during the connection set up process. The first message may be a UE capability information message. The UE may transfer its radio access capability information to the eNB (E-UTRAN). If the UE has changed its E-UTRAN radio access capabilities, the UE may request higher layers to initiate a procedure that would result in the update of UE radio access capabilities using a new RRC connection. A UE may be able to communicate with the E-UTRAN about its radio access capabilities, such as the system (including the release and frequency band) that the UE supports, the UE receive and transmit capabilities (single/dual radio, dual receiver), and/or the like. The first RRC message may comprise one or more parameters indicating whether the wireless device supports an enhanced physical downlink control channel (ePDCCH). The first RRC message may comprise one or more parameters providing information (explicitly or implicitly) on whether the wireless device supports new carrier types (NCT). Example of NCTs are stand alone NCT, synchronized NCT, unsynchronized NCT, and/or the like.

The base station may transmit selectively and if the one or more parameters indicates support of ePDCCH, at least one second RRC message configured to cause, in the wireless device, configuration of one or more ePDCCHs. The base station may receive UE capability information from the wireless device. If the wireless device does not support ePDCCH, then the base station does not configure ePDCCH for the wireless device. If the wireless device indicates that it supports ePDCCH configuration, the base station may decide to configure ePDCCH or not to configure ePDCCH for the wireless device. This decision is based on internal base station mechanisms, and may be based, at least in part, on base station configuration settings, UE QoS profile, UE bearers, mobility, a combination thereof, and/or the like.

The at least one second RRC message configured to cause, in the wireless device, configuration of ePDCCH on existing configured carriers (for example a primary cell, a secondary cell), or on newly added cells (legacy or NCT cell). The at least one second RRC message may further cause, in the wireless device, configuration of other radio channels and parameters, such as, uplink data channel, downlink data channel, uplink control channel, downlink control channel, power control parameters, measurement parameters, radio bearers, a combination thereof, and/or the like. The at least one second RRC message configuring ePDCCH may comprise at least one of: subframe subset configuration, ePDCCH starting position in the subset of subframes, and at least one ePDCCH transmission and resource configuration. Some of the parameters may be considered optional.

According to some of the various aspects of embodiments, an ePDCCH of a downlink carrier may be configured for a subset of subframes in a plurality of subframes. The at least one second RRC message may comprise subframe configuration information. For example at least one second RRC message may comprise a bitmap indicating which subframe(s) in radio frames are configured with ePDCCH resources. The ePDCCH bitmap may configure the subframes which the UE may monitor search space(s) on ePDCCH. A UE may monitor a UE-specific search space in ePDCCH radio resources. The bitmap may be for example 40 bits, and may indicate the ePDCCH subframes for the duration of four frames. For example, a value of zero may indicate no ePDCCH resources in the corresponding subframe for the UE, and a value of one may indicate ePDCCH resources are configured for the UE in the corresponding subframe. In this example, the same pattern may be repeated in every four frame (40 subframes). In another example for TDD frame structure, the bitmap may be 20, 60, or 70 bits. If the bitmap is not included in the at least one second message configuring EPDCCH, then ePDCCH may be configured in every subframe. A UE may monitor the UE-specific search space on ePDCCH in all subframes except when according to some pre-defined rules when other parameters, for example, measurement parameters, may not allow monitoring of ePDCCH in that subframe.

According to some of the various aspects of embodiments, the at least one second RRC message may comprise a starting symbol parameter indicating ePDCCH starting symbol in ePDCCH configured subframes. The starting symbol parameter may indicate the OFDM starting symbol for any ePDCCH and PDSCH scheduled by ePDCCH on the same cell, if the UE is not configured with coordinated multimode transmission mode. If starting symbol parameter is not present in the RRC message configuring ePDCCH, the UE may derive the starting OFDM symbol of ePDCCH and PDSCH scheduled by the ePDCCH from PCFICH (format indicator parameter) transmitted in the same subframe. In an example embodiment, values zero, one, two, and three may applicable for dl-Bandwidth greater than ten resource blocks, and values two, three, and four may be applicable. The starting symbol parameter may not be configured employing the starting symbol parameter when UE is configured with coordinated multimode transmission mode.

According to some of the various aspects of embodiments, in a given subframe of a cell, some of the UEs may be configured with ePDCCH and some other UEs may not be configured with ePDCCH in the given subframe. The PDSCH starting position in the given subframe for UEs that are configured with ePDCCH in the cell may be determined employing the starting symbol parameter. PDSCH starting position in the given subframe for UEs that are not configured with ePDCCH in the cell may be determined employing PCFICH or other RRC messages.

According to some of the various aspects of embodiments, the at least one second RRC message configuring ePDCCH may comprise at least one ePDCCH transmission and resource configuration. For example, ePDCCH may comprise one or two ePDCCH transmission and resource configuration. An ePDCCH transmission and resource configuration may be identified by an ePDCCH index. The ePDCCH index may be used to add or release ePDCCH transmission and resource configuration to or from an existing configured ePDCCH. The ePDCCH transmission and resource configuration may comprise one or more parameters, including one or more of the following parameters: frequency resources, frequency distribution, frequency assignment, reference sequence, corresponding uplink control channel parameter, and coordinated transmission mode parameters. The ePDCCH transmission and resource configuration may be applicable to the subset of subframes in which ePDCCH is configured.

According to some of the various aspects of embodiments, frequency resources parameter may indicate the number of physical resource-block pairs used for the ePDCCH. For example this may have the value of two, four or six. The frequency distribution parameter may indicate whether the frequency resources (resource blocks) are distributed or localized. In localized distribution, resource blocks in ePDCCH transmission may be contiguous, and in a distributed distribution resource blocks in ePDCCH may be distributed in the carrier bandwidth. The frequency assignment parameter indicates the assignment of specific resource blocks in resource blocks of LTE carrier to the ePDCCH. The frequency assignment, for example, may be an index to a specific combination of physical resource-block pairs for ePDCCH set as defined in a pre-defined look-up table. The reference sequence parameter may indicate the demodulation reference signal scrambling sequence initialization parameter for ePDCCH symbols. The corresponding uplink control channel parameter may indicate PUCCH format 1a and 1b resource starting offset for the ePDCCH set. For example, uplink PUCCH radio resources for transmitting ACK/NACK for downlink transport blocks (MAC/PHY packets) transmitted in the PDSCH scheduled by ePDCCH is determined based, at least in part, employing the corresponding uplink control channel parameter. The uplink control channel parameter may indicate the frequency start offset in terms of resource blocks in the uplink carrier. The coordinated transmission mode parameters may indicate the starting OFDM symbol, the related rate matching parameters and quasi-collocation assumption for ePDCCH when the UE is configured in coordinated transmission mode. A coordinated transmission mode parameter may provide the index of PDSCH configuration for coordinated transmission mode.

In another example embodiment, the same RRC message may configure cell(s) and ePDCCH in the downlink of the cell. The RRC message causing the configuration of carriers (cells) in the wireless device may comprise an identifier for a carrier in the plurality of carriers, information identifying a carrier type for each carrier in the plurality of carriers, and information associating at least one non-backward compatible carrier (NCT) with a backward compatible carrier. The control message may further comprise information associating a non-backward compatible carrier with a backward compatible carrier. Carrier type for example may be backward compatible, non-backward compatible. The carrier type may further determine if the carrier is synchronized, non-synchronized, and/or a segment carrier. The carrier type may determine if the non-backward compatible carrier is a standalone carrier or depends on (is associated with) another carrier. The carrier type information may be transmitted explicitly by a carrier type parameter, or may be determined based one or more parameters in the RRC message(s).

According to some of the various aspects of embodiments, an ePDCCH may carry scheduling assignments for uplink and downlink of one or more cells. Scheduling assignments includes transmission format (modulation and coding) and resource assignment information. The base station may transmit first transmission format and scheduling information by the base station on an ePDCCH in a first subframe of the subset of subframes. The first transmission format and the scheduling information may be for one or more first data packets (transport blocks) transmitted on a data channel of the first carrier. The base station may transmit the one or more first data packets to the wireless device on the first data channel in the first subframe according to the transmission format and the scheduling information.

According to some of the various aspects of embodiments, an ePDCCH of a first carrier may provide scheduling assignment for transport blocks (packets) transmitted on uplink data channel and downlink data channel of the first carrier. Cross carrier scheduling may be configured by higher layers (e.g., RRC), for example, for a second carrier. The ePDCCH of a first carrier may also provide scheduling assignment for transport blocks (packets) transmitted on uplink data channel and downlink data channel of the second carrier. ACK/NACK for packets transmitted in the downlink (according to ePDCCH assignment) may be provided in PUCCH resources identified by the corresponding uplink control channel parameter (in RRC message). ACK/NACK may also be piggybacked and be transmitted in uplink transport blocks transmitted in the uplink shared channel. ACK/NACK for packets transmitted in the uplink (according to ePDCCH assignment) may be provided in the downlink employing physical HARQ indicator channel of the first carrier. Radio resource configuration of physical HARQ indicator channel of the first carrier may be determined according to master information block transmitted in PBCH, or may be transmitted by higher layers (e.g. RRC) when the first carrier is configured. HARQ radio resources (symbol(s), subcarrier(s)) transmitting ACK/NACK for an uplink packet scheduled by ePDCCH assignment may be determined according to a physical resource block offset of the uplink resources. For example, a pre-defined relationship (e.g. look-up table, formula, relationship) may determine downlink HARQ resources for an uplink packet transmitted on physical uplink shared channel.

According to some of the various aspects of embodiments, ePDCCH resources may be configured for one or more carriers in one or more configured carriers for a wireless device. For example, ePDCCH may be configured for at least one of a primary carrier, a secondary carrier, a backward-compatible carrier or a non-backward compatible carrier. In an example embodiment, the starting symbol of ePDCCH and PDSCH for a primary carrier or for a backward-compatible secondary carrier may be one of the second, third, fourth symbol, or fifth symbol (respectively corresponding to symbol 1, 2, 3, 4). In another example, the starting symbol of ePDCCH and PDSCH for a non-backward compatible secondary carrier may be one of the first, second, third, fourth symbol, or fifth symbol (respectively corresponding to symbol 0, 1, 2, 3, 4). At least the first symbol in a primary carrier or in a backward compatible secondary carrier is allocated to legacy PCFICH, legacy PDCCH and legacy HARQ channels. In a non-backward compatible secondary carrier legacy PCFICH, legacy PDCCH and/or legacy HARQ channels may be avoided as a whole in the carrier. This may increase spectral efficiency of non-backward compatible carriers compared with backward compatible carriers.

According to some of the various aspects of embodiments, an ePDCCH may be transmitted on a backward compatible or non-backward compatible carrier. The ePDCCH may not be transmitted in certain subframes, e.g., subframes configured with multicast transmission and some TDD special subframes. Physical multicast channel (PMCH) may occupy all resource blocks of a carrier. RRC message(s) may cause configuration of the subset of subframes in which a UE may monitor ePDCCH. If one the configured ePDCCH subframes overlaps with a PMCH subframe, the UE may monitor UE-specific search space on PDCCH of the subframe and may not search ePDCCH resources on a subframe with configured PMCH transmission. In new carrier types, PDCCH may be configured for a subset of subframes. If legacy control region is configured on a new carrier type, a reference signal transmitted in the control radio resource region may be used to demodulate the legacy control channel.

According to some of the various aspects of embodiments, legacy downlink control channels may be configured for subframes with configured PMCH. The subframes that are configured with PMCH may be configured with PDCCH, PCFICH, and/or PHICH. PDCCH resources in PMCH may be employed for scheduling uplink packets in an uplink subframe. This may increase uplink spectral efficiency in a new type carrier. In another example embodiment, configuration parameters of PDCCH may be included in the RRC message configuring the new carrier type. PDCCH configuration parameters may include at least: subframe configuration, and/or PDCCH duration. Subframe configuration parameters for example could be in the form of a bitmap. For example a bitmap with length of 40 bits may indicate the subset of subframes with configured PDCCH with a period of 4 frames. In another example embodiment, a subframe index and a subframe period may be used to determine the subset of subframes with a configured PDCCH. A PDCCH may occupy one, two, three or four symbols. PDCCH duration parameter in RRC message may indicate the number of symbols allocated in to PDCCH. In another example embodiment, subframe configuration parameter in the RRC message may indicate the subset of subframes with configured PCFICH, and PDCCH configuration. PCFICH in each subframe may determine the duration of PCFICH in the same subframe. In another example embodiment, subframe configuration parameter in the RRC message may indicate the subset of subframes with configured with PCFICH, PDCCH, and PHICH. PHICH radio resources may be employed for transmission of ACK/NACK in the downlink for packets transmitted in the uplink.

According to some of the various aspects of embodiments, RRC message(s) may configure cross carrier scheduling for a new type carrier. RRC message may configure cross carrier scheduling for a subset of subframes. The cross carrier scheduling configuration parameters may comprise a bitmap indicating the subset of subframes that cross carrier scheduling is configured for a new type carrier. For example, cross carrier scheduling may be configured for subframes including PMCH transmission. In non-PMCH subframes, the ePDCCH of the same carrier may be used for scheduling assignments. In PMCH subframes, the ePDCCH or PDCCH of another carrier may be employed for uplink packet assignment of the carrier employing cross carrier scheduling.

According to some of the various aspects of embodiments, new type (also called non-backward compatible or non-prime) carriers may be configured to work in association with another backward compatible carrier. New carrier types may be deployed in heterogeneous networks and/or homogeneous networks, and may coexist with backward compatible carriers in the same base station/sector. In another example embodiment, new carrier types may be configured on standalone bases without backward compatible carriers. New type carriers may have reduced legacy control signalling and common reference signals. The interference and overhead levels on the new carrier types may be reduced compared to backward compatible carriers. A new carrier type may be synchronized with another carrier in the same band. In another example embodiment, a new carrier type may not be synchronized with another carrier.

New carrier types may transmit reduced or no common reference signal compared with backward compatible carriers. In one example embodiment, new carrier type may carry one reference signal port (for example, common reference signal port 0 resource elements per physical resource block) and may employ legacy common reference signal sequences. Common reference signals may be transmitted within one subframe with five ms periodicity. In this example, two of the ten subframes in a frame may transmit common reference signals. The common reference signal may be employed by the wireless device for example, for channel state measurement, time and/or frequency synchronization, receiver parameter estimation, and/or the like. Common reference signal may be transmitted on all resource blocks in the bandwidth or in a subset of resource block. In an example embodiment, the bandwidth of common reference signal may be configured by higher layers (e.g. RRC layer). For example, common reference signal may be transmitted on 6 resource blocks or 25 resource blocks according to RRC configuration. RRC configuration parameters for example may include at least one of: configuration of common reference subframes (e.g. subframe index, periodicity, and/or bitmap configuration), frequency resources (common reference signal bandwidth, frequency offset, and/or frequency shift in resource blocks). In an example embodiment a subframe bitmap parameter may indicate the subset of subframes transmitting common reference signals. In an example embodiment, a resource block bitmap parameter may indicate the resource blocks transmitting common reference signals. Configuration of common reference signal may consider that the reduced common reference signal may impact the time and frequency synchronization performance and radio resource monitoring measurements. In an example embodiment, common reference signal may be transmitted in the same subframe as the primary and secondary synchronization signals. In another example embodiment, a subframe offset parameter may be configured by higher layers (e.g. RRC). A cell-specific frequency shift may be used for common reference signals. The motivation of frequency shift is to reduce common reference signal collision among neighbouring cells. In an example embodiment, the frequency shift may be determined by the physical cell identifier. In another example embodiment, frequency shift may be configured employing configuration parameters comprised in RRC messages configuring a new type carrier.

According to some of the various aspects of embodiments, a new type carrier may be configured as a synchronized carrier. The UE may be configured to acquire time and frequency synchronization from a backward compatible carrier to which the synchronized carrier is associated with. In an example embodiment, RRC message(s) configuring the new type carrier may comprise the carrier index of the backward compatible carrier associated with the new type carrier. The synchronized and non-synchronized carrier may include reduced CRS transmission configurable by parameters comprised in an RRC message. In an example embodiment, a synchronized carrier may be configured to not transmit any common reference signals and/or synchronization signals.

According to some of the various aspects of embodiments, primary and secondary signals may be transmitted on a non-synchronized carrier. The primary and secondary synchronization signals may be transmitted in the centre six resource blocks of a carrier. The time location of the primary and secondary synchronization signal may be configured using RRC message configuring the new type carrier. In an example configuration of a new carrier type, there may be collisions between radio resource of primary/secondary synchronization signals and demodulation reference signals. To resolve this issue, demodulation reference signals may not be transmitted when it overlaps with the synchronization signals. In an example embodiment, primary and secondary synchronization signals may not be transmitted on a synchronized new carrier type. This may reduce signalling overhead and increase spectral efficiency. An RRC message configuring a new type carrier may provide configuration parameters for primary and secondary synchronization signals and/or may indicate whether primary and/or secondary synchronization signals are transmitted or not.

New carrier types may support existing and/or new transmission modes compared with backward compatible carrier. RRC layer may provide information to the UE indicating which transmission modes are employed for transmission of transport blocks on a new carrier type. According to some of the various aspects of embodiments, sounding reference configuration for backward compatible carriers may be improved to include the capability of transmitting sounding reference signal on all active uplink resource blocks of a carrier. In legacy sounding reference signal configuration, sounding reference signal may not be transmitted on resource blocks of PUCCH radio resources in the uplink. Sounding reference signal configuration may be improved to include all resource blocks employed for PUSCH (including resource blocks employed for PUCCH in legacy carrier, which are available for PUSCH in new type carriers). The SRS bandwidth may be chosen assuming that all active RBs in the uplink may be used for PUSCH. Then eNB may be able to sound any resource block usable for PUSCH transmission.

Figure 5:
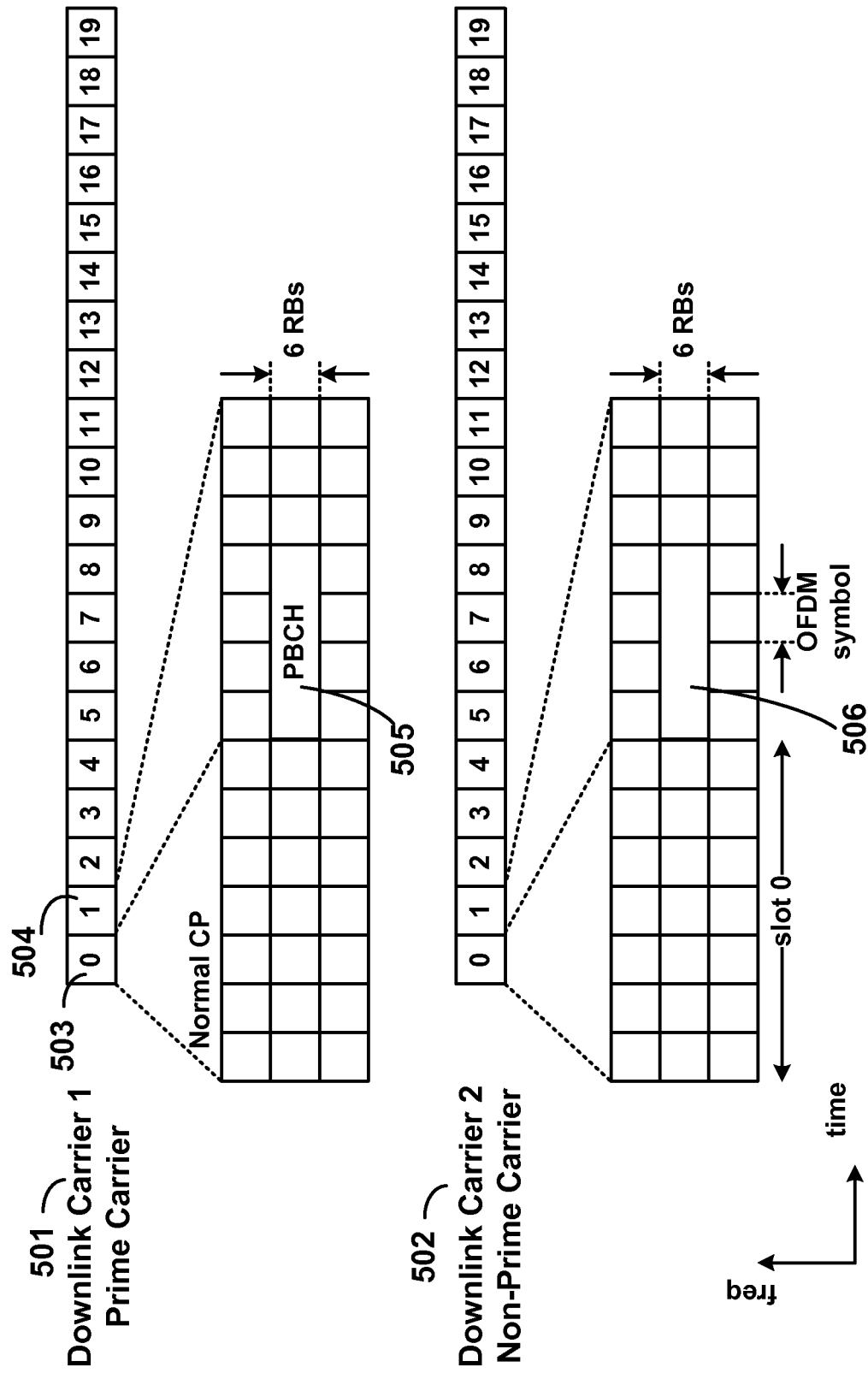
FIG. 5 is a diagram depicting time and frequency resources for two carriers according to an exemplary embodiment.
Figure 6:
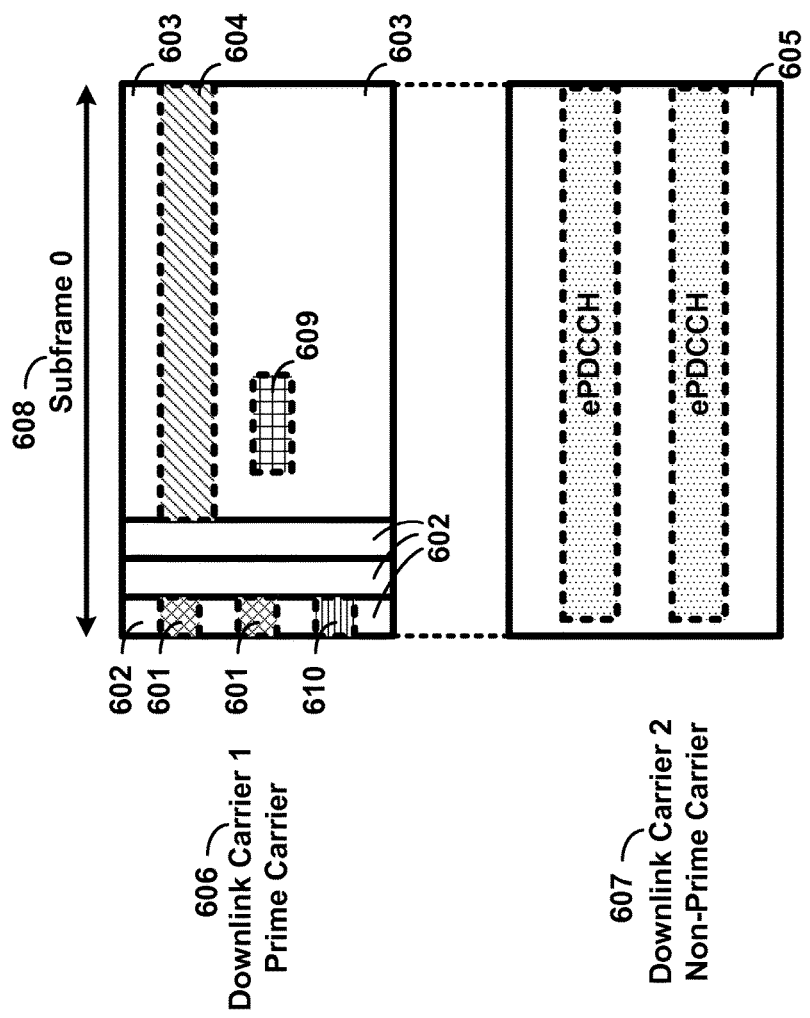
FIG. 6 is a diagram illustrating transmission of data and control information according to an exemplary embodiment.

FIG. 5 is a diagram depicting time and frequency resources for carrier one 501 and carrier two 502 and FIG. 6 is a diagram illustrating transmission of data and control information according to one aspect of the illustrative embodiments. An example embodiment of the invention provides a method and system for a wireless transmitter in a communication network including a plurality of carriers. Each of the plurality of carriers may include a plurality of OFDM subcarriers. Transmission time may be divided into a plurality of subframes, and each subframe in the plurality of subframes may further be divided into a plurality of OFDM symbols.

The transmitter may transmit a synchronization signal including a primary synchronization signal and a secondary synchronization signal on a first carrier 501. The synchronization signal may indicate a physical cell ID for the first carrier 501. It may also provide timing information for the first carrier 501 and a second carrier 502 in the plurality of carriers. The synchronization signal may be transmitted using a plurality of subcarriers in the in the middle of the frequency band of the first carrier 501 on the first and sixth subframes (subframe 0 and 5) of each frame in the plurality of frames. Primary and secondary synchronization signal may occupy a bandwidth equal to six resource blocks. A physical broadcast channel (PBCH) 505 may be transmitted in slot one 504 of subframe 0 of the first carrier 501.

The transmitter may transmit a first plurality of data packets on a first data channel 603 of the first carrier 606 on a first plurality of OFDM subcarriers. A first plurality of OFDM subcarriers may exclude the plurality of subcarriers used for transmission of the primary and secondary synchronization signals in the first and sixth subframes in the plurality of frames.

The transmitter may transmit a first plurality of broadcast system information messages on the first data channel 603. The plurality of broadcast system information messages include radio link configuration information for a wireless device receiving the first carrier 606 and the second carrier 607 signals.

The transmitter may transmit a second plurality of data packets on a second data channel 605 on a second plurality of OFDM subcarriers of the second carrier 607.

The second plurality of OFDM subcarriers of the second carrier 502 may include the OFDM subcarriers in the middle of the frequency band of the second carrier 502 in the first and sixth subframes in the plurality of frames. No primary synchronization signal and no secondary synchronization signal may be transmitted on the second carrier in radio resource. No broadcast system information message may be transmitted on the second data channel 605. No physical broadcast channel may be transmitted in radio resource 506. Subframe timing of the second data channel is provided by the synchronization signal transmitted on the first carrier. Multiple options may be available, for example second carrier may transmit synchronization signal but do not transmit the physical broadcast channel. In another example, both carriers may transmit both synchronization signal and physical broadcast channel.

The first plurality of data packets and the second plurality of data packets may be transmitted using a plurality of physical resource blocks including reference signal symbols and data symbols. The broadcast system information messages may be RRC system information blocks. The radio link configuration information may include measurement configuration, uplink channel configuration or handover parameters.

The primary synchronization signal may be generated using a frequency-domain Zadoff-Chu sequence. The primary synchronization signal may be mapped to the last OFDM symbol in slots zero and ten for FDD frame structure. The primary synchronization signal may be mapped to the third OFDM symbol in subframes 1 and 6 for TDD frame structure.

The secondary synchronization signal may be generated using an interleaved concatenation of two length-31 binary sequences. The concatenated sequence may be scrambled with a scrambling sequence given by the primary synchronization signal. The portion of the secondary synchronization signal transmitted in subframe zero may be different from the portion of the secondary synchronization signal transmitted in subframe five.

A control channel 602 may be transmitted on the first carrier 606. The control channel 602 may provide transmission format and scheduling information for the first plurality of data packets and the second plurality of data packets. The control channel 602 may be transmitted on the first carrier 606 starting from the first OFDM symbol of each subframe. The control channel may be a physical downlink control channel. No physical control format indicator channel and no physical downlink control channel may be transmitted on the second carrier 607. Radio resources of the second data channel 605 may start from the first OFDM symbol of each subframe of the second carrier 607 and end at the last OFDM symbol of each subframe of the second carrier 607. No HARQ feedback may be transmitted on the second carrier 607. Subframe timing of the second carrier 607 may be synchronized with subframe timing of the first carrier 606.

Another example embodiment of the present invention provides a method and system for a wireless receiver in a communication network including a plurality of carriers. Each of the plurality of carriers may include a plurality of OFDM subcarriers. Reception time may be divided into a plurality of subframes. Each subframe in the plurality of subframes may further be divided into a plurality of OFDM symbols.

The receiver may receive a synchronization signal including a primary synchronization signal and a secondary synchronization signal on a first carrier 501. The synchronization signal may indicate a physical cell ID for the first carrier. It may also provide timing information for the first carrier 501 and a second carrier 502 in the plurality of carriers. The synchronization signal may be received using a plurality of subcarriers in the in the middle of the frequency band of the first carrier 501 on the first and sixth subframes (subframe 0 and 5) of each frame in the plurality of frames. A physical broadcast channel (PBCH) 505 may be received in slot one 504 of subframe 0 of the first carrier 501.

The receiver may receive a first plurality of data packets on a first data channel 603 of the first carrier 606 on a first plurality of OFDM subcarriers. A first plurality of OFDM subcarriers may exclude the plurality of subcarriers used for transmission of the primary and secondary synchronization signals in the first and sixth subframes in the plurality of frames.

The receiver may receive a first plurality of broadcast system information messages on the first data channel 603. The plurality of broadcast system information messages may include radio link configuration information for the wireless receiver receiving the first carrier 606 and the second carrier 607 signals.

The receiver may receive a second plurality of data packets on a second data channel 605 on a second plurality of OFDM subcarriers of the second carrier 607. The second plurality of OFDM subcarriers of the second carrier 607 may include the OFDM subcarriers in the middle of the frequency band of the second carrier 502 in the first and sixth subframes in the plurality of frames. No primary synchronization signal and no secondary synchronization signal may be received on the second carrier in radio resource. No broadcast system information message may be received on the second data channel 605. No physical broadcast channel may be received in radio resource 506. Subframe timing of the second data channel may be provided by the synchronization signal received on the first carrier.

The first plurality of data packets and the second plurality of data packets are received using a plurality of physical resource blocks including reference signal symbols and data symbols. The broadcast system information messages may be RRC system information blocks. The radio link configuration information may include measurement configuration, uplink channel configuration, or handover parameters.

The primary synchronization signal may be generated using a frequency-domain Zadoff-Chu sequence. The primary synchronization signal may be mapped to the last OFDM symbol in slots zero and ten for FDD frame structure. The primary synchronization signal may be mapped to the third OFDM symbol in subframes 1 and 6 for TDD frame structure.

The secondary synchronization signal may be generated using an interleaved concatenation of two length-31 binary sequences. The concatenated sequence may be scrambled with a scrambling sequence given by the primary synchronization signal. The portion of the secondary synchronization signal transmitted in subframe zero may be different from the portion of the secondary synchronization signal transmitted in subframe five.

A control channel 602 is received on the first carrier 606. The control channel 602 may provide transmission format and scheduling information for the first plurality of data packets and the second plurality of data packets. The control channel 602 may be received on the first carrier 606 starting from the first OFDM symbol of each subframe. The control channel 602 may be a physical downlink control channel. No physical control format indicator channel and no physical downlink control channel may be received on the second carrier 607. Radio resources of the second data channel 605 may start from the first OFDM symbol of each subframe of the second carrier 607 and end at the last OFDM symbol of each subframe of the second carrier 607. No HARQ feedback may be received on the second carrier 607. Subframe timing of the second carrier 607 may be synchronized with subframe timing of the first carrier 606.

FIG. 6 is a diagram illustrating data and control transmission channels according to one aspect of the illustrative embodiments. An example embodiment of the present invention provides a method and system for a wireless transmitter in a communication network including a plurality of carriers. Each of the plurality of carriers may include a plurality of OFDM subcarriers. Transmission time may be divided into a plurality of subframes, and each subframe in the plurality of subframes may further be divided into a plurality of OFDM symbols.

The transmitter may transmit a first control channel 601 on the first OFDM symbol of each subframe 608 in the plurality of subframes of a first carrier 606 in the plurality of carriers. Each instance of the first control channel 601 transmitted in a subframe 608 in the plurality of subframes may indicate the number of OFDM symbols in the subframe that are preferably allocated for transmission of a second control channel 602 on the subframe 608 of the first carrier 606.

The transmitter may transmit the second control channel 602 on the first carrier 606. The second control channel 602 may provide transmission format and scheduling information for a first plurality of data packets transmitted on a first data channel 603 of the first carrier 606. The second control channel 602 may be transmitted on the first carrier 606 starting from the first OFDM symbol of the subframe 608. A subset of OFDM subcarriers of the first symbol of each subframe is used by the first control channel, and a second subset of OFDM subcarriers of the first symbol of each subframe is used by the second control channel.

The transmitter may transmit the first plurality of data packets on the first data channel 603. The first data channel transmission may start from the OFDM symbol immediately after the number of OFDM symbols allocated for the second control channel 602. For example in a given subframe, the first, second and third symbols are used by the first and second control channel, and the forth to fourteenth symbols are used by the first data channel.

The transmitter may transmit a control message 604 on the first data channel 603 indicating that radio resources of a second data channel 605 start from the first OFDM symbol of each subframe of a second carrier 607 in the plurality of carriers. The control message may further indicate that the second control channel 602 includes transmission format and scheduling information for a second plurality of data packets transmitted on the second data channel 605 of the second carrier 607. The control message 604 may be transmitted only once or only when the radio configuration changes. The control message 604 may not be transmitted in every subframe.

The transmitter may transmit the second plurality of data packets on the second data channel 605. Radio resources for the second data channel 605 may start from the first OFDM symbol and end at the last OFDM symbol of each subframe 608 of the second carrier 607. The transmission format and scheduling information for the second plurality of data packets may be transmitted on the second control channel 602 of the first carrier 606.

Synchronization signal may be transmitted in subframes 0 and 5 in the middle of the band 609 on carrier one. Synchronization signal is not transmitted in carrier two 607. Instead the same resource may be allocated to the second data channel 605.

In another example embodiment of this invention, the transmitter may transmit a control channel 602 on a first carrier 606 in the plurality of carriers. The second control channel 602 may provide transmission format and scheduling information for a first plurality of data packets transmitted on a first data channel 603 of the first carrier 606.

The transmitter may transmit a control message 604 on the first data channel indicating that radio resources of a second data channel 605 start from the first OFDM symbol of each subframe of a second carrier 607 in the plurality of carriers. The control message 604 may further indicate that the second control channel 602 includes transmission format and scheduling information for a second plurality of data packets transmitted on the second data channel 605.

The transmitter transmit the second plurality of data packets on the second data channel 605. Radio resources for the second data channel 605 may start from the first OFDM symbol and end at the last OFDM symbol of each subframe 608 of the second carrier. The transmission format and scheduling information for the second plurality of data packets may be transmitted on the second control channel 602 of the first carrier 606.

The first control channel 601 may be transmitted on a first subset of the plurality of OFDM subcarriers of the first carrier 606. Each instance of the first control channel 601 may indicate one of three possible values after being decoded. The range of possible values of each instance of the first control channel may depend on many parameters including the first carrier bandwidth. For example for a given bandwidth, the first control channel may indicate of three possible values of 1, 2, or 3 symbols. The first control channel 601 is transmitted on the first OFDM symbol of each subframe 608 of the first carrier 606 using QPSK modulation. The first control channel 601 may be coded using a block encoder before transmission. The first control channel 601 may be scrambled by a transmitter ID before transmission. The transmitter ID may be for example the physical cell ID.

The second control channel 602 may be transmitted on a second subset of the plurality of OFDM subcarriers of the first carrier 606. The second control channel 602 may be transmitted using QPSK modulated symbols. The second control channel 602 may be coded by tail biting convolutionally encoder before transmission. The second control channel 602 may further provide power control commands for uplink channels, for example power control commands for physical uplink shared channel or physical uplink control channel. The OFDM subcarriers that are allocated for transmission of the second control channel 602 may occupy the entire bandwidth of the first carrier 606. The second channel may not use the entire subcarriers allocated to it. The second control channel 602 may carry a plurality of downlink control packets in each subframe 608 in the plurality of subframes. Each of the plurality of downlink control packets may be scrambled using a radio network identifier.

The first plurality of data packets and the second plurality of data packets may be encrypted packets. Each of the first plurality of data packets and each of the second plurality of data packets may be assigned to a radio bearer. A first plurality of packets that are assigned to the same radio bearer may be encrypted using an encryption key and at least one parameter that changes substantially rapidly over time.

The control message 604 may be encrypted and may be protected by an integrity header before it is transmitted. The control message 604 may be transmitted by an RRC protocol. The control message 604 may further include configuration information for physical channels for a wireless terminal. The control message 604 may set up or modify at least one radio bearer. The control message 604 may modify configuration of at least one parameter of a MAC layer or a physical layer. The control message 604 may be an RRC connection reconfiguration message.

No physical control channel may be transmitted on the second carrier 607. No HARQ feedback may be transmitted on the second carrier 607. Subframe timing of the second carrier 607 may be preferably synchronized with subframe timing of the first carrier 606.

Another example embodiment of the invention provides a method and system for a wireless receiver in a communication network including a plurality of carriers. Each of the plurality of carriers may include a plurality of OFDM subcarriers. Reception time may be divided into a plurality of subframes 602. Each subframe 202 in the plurality of subframes may further be divided into a plurality of OFDM symbols 203.

The receiver may receive a first control channel 601 on the first OFDM symbol of each subframe 608 in the plurality of subframes of a first carrier 606 in the plurality of carriers. Each instance of the first control channel 601 received in a subframe 608 in the plurality of subframes may indicate the number of OFDM symbols in the subframe that are allocated for reception of a second control channel 602 on the subframe of the first carrier 606.

The receiver may receive the second control channel 602 on the first carrier 606. The second control channel 602 may provide reception format and scheduling information for a first plurality of data packets received on a first data channel 603 of the first carrier 606. The second control channel 602 may be received on the first carrier 606 starting from the first OFDM symbol of the subframe 608. A subset of OFDM subcarriers of the first symbol of each subframe is used by the first control channel, and a second subset of OFDM subcarriers of the first symbol of each subframe is used by the second control channel.

The receiver may receive the first plurality of data packets on the first data channel 603. The first data channel reception may start from the OFDM symbol immediately after the number of OFDM symbols allocated for the second control channel 602. For example in a given subframe, the first, second and third symbols are used by the first and second control channel, and the forth to fourteenth symbols are used by the first data channel.

The receiver may receive a control message 604 on the first data channel 603 indicating that radio resources of a second data channel 605 start from the first OFDM symbol of each subframe of a second carrier 607 in the plurality of carriers. The control message may further indicate that the second control channel 602 includes reception format and scheduling information for a second plurality of data packets received on the second data channel 605 of the second carrier 607. The control message 604 may be received only once or only when the radio configuration changes. The control message 604 may not be received in every subframe.

The receiver may receive the second plurality of data packets on the second data channel 605. Radio resources for the second data channel 605 may start from the first OFDM symbol and end at the last OFDM symbol of each subframe 608 of the second carrier 607. The reception format and scheduling information for the second plurality of data packets may be received on the second control channel 602 of the first carrier 606.

In another example embodiment of this invention, the wireless receiver may receive a second control channel 602 on a first carrier 606 in the plurality of carriers. The second control channel 602 may provide reception format and scheduling information for a first plurality of data packets received on a first data channel 603 of the first carrier 606.

The receiver may receive a control message 604 on the first data channel indicating that radio resources of a second data channel 605 start from the first OFDM symbol of each subframe of a second carrier 607 in the plurality of carriers. The control message 604 may further indicate that the second control channel 602 includes reception format and scheduling information for a second plurality of data packets received on the second data channel 605.

The receiver may receive the second plurality of data packets on the second data channel 605. Radio resources for the second data channel 605 may start from the first OFDM symbol and end at the last OFDM symbol of each subframe 608 of the second carrier. The reception format and scheduling information for the second plurality of data packets may be received on the second control channel 602 of the first carrier 606.

The first control channel 601 may be received on a first subset of the plurality of OFDM subcarriers of the first carrier 606. Each instance of the first control channel 601 may indicate one of three possible values after being decoded. The range of possible values of each instance of the first control channel may depend on many parameters including the first carrier bandwidth 606. For example for a given bandwidth, the first control channel may indicate of three possible values of 1, 2, or 3 symbols. The first control channel 601 may be received on the first OFDM symbol of each subframe 608 of the first carrier 606 using QPSK demodulation. The first control channel 601 may be decoded using a block decoder after being received. The first control channel 601 may be de-scrambled using a receiver ID after being received. The transmitter ID may be for example the physical cell ID.

The second control channel 602 may be received on a second subset of the plurality of OFDM subcarriers of the first carrier 606. The second control channel 602 may be received using QPSK demodulation of OFDM symbols. The second control channel 602 may be decoded by tail biting convolutionally decoder after being received. The second control channel 602 may further provide power control commands for uplink channels, for example power control commands for physical uplink shared channel or physical uplink control channel. The OFDM subcarriers that are allocated to the second control channel 602 may occupy the entire bandwidth of the first carrier 606. The second channel may not use the entire subcarriers allocated to it. The second control channel 602 may carry a plurality of downlink control packets in each subframe 608 in the plurality of subframes. Each of the plurality of downlink control packets may be descrambled using a radio network identifier.

The first plurality of data packets and the second plurality of data packets may be encrypted packets. Each of the first plurality of data packets and each of the second plurality of data packets may be assigned to a radio bearer. A first plurality of packets that are assigned to the same radio bearer may be decrypted using a decryption key and at least one parameter that changes substantially rapidly over time.

The control message 604 may be decrypted and its integrity header may be verified before being processed. The control message 604 may be received by an RRC protocol. The control message 604 may further include configuration information for physical channels for the wireless terminal. The control message 604 may set up or modify at least one radio bearer. The control message 604 may modify configuration of at least one parameter of a MAC layer or a physical layer. The control message 604 may be an RRC connection reconfiguration message.

No physical control channel may be received on the second carrier 607. No HARQ feedback may be received on the second carrier 607. Subframe timing of the second carrier 607 may be synchronized with subframe timing of the first carrier 606.

In an example embodiment, non-prime carrier (equally called non-backward compatible carrier) may include ePDCCH resources. ePDCCH is enhanced physical downlink control channel and may act as PDCCH for the non-prime carrier. ePDCCH may carry scheduling information for downlink and uplink shared channels and may also carrier power control information for uplink transmissions.

According to some of the various embodiments, a base station in a communication network may receive from a wireless device a first channel state information. The first channel state information may comprise a first precoding matrix identifier. The first channel state information may additionally include CQI and RI. The base station may transmit to the wireless device one or more data packets on a data channel employing the first precoding matrix identifier. The base station may transmit one or more control packets on a control channel to the wireless device employing a second precoding matrix. The second precoding matrix may be computed based, at least in part, on the first channel state information. The one or more control packets may carry scheduling information for the data channel.

The first precoding matrix identifier may be an index of a precoding matrix in a precoding codebook. The first precoding matrix identifier may be obtained at the wireless device based on maximizing a quality metric such as signal power, signal to noise ratio, signal to noise and interference ratio, channel capacity or achievable data rate, etc. The control channel may be transmitted on a subset of antennas ports, and employing a subset of layers used for data transmission. The base station may compute the second precoding matrix based on a submatrix of a first precoding matrix identified by the first precoding matrix identifier. The control channel may be transmitted on a number of virtual antennas that are formed by applying a linear processing on physical antennas. The base station may use a linear transformation on a subset of rows and columns of the first precoding matrix to obtain the second precoding matrix. The linear transformation used to derive the second precoding matrix from the first precoding matrix may be a function of the linear processing used to form virtual antennas for control channel transmission. The base station may use other forms of transformation on a subset of rows and columns of the first precoding matrix to obtain the second precoding matrix.

According to some of the various embodiments, a base station may transmit to a wireless device channel state information reference signals. The base station may receive from the wireless device a first channel state information. The first channel state information may comprise a first precoding matrix identifier. The first channel state information may be computed employing the channel state information reference signals. The base station may transmit to the wireless device first downlink signals employing the first precoding matrix identifier. The first downlink signals may comprise one or more data packets and first demodulation reference signals. The one or more data packets may be transmitted on a data channel. The first demodulation reference signals may be used to demodulate the one or more data packets. The base station may transmit to the wireless device second downlink signals employing a second precoding matrix. The second downlink signals may comprise one or more control packets and second demodulation reference signals. The one or more control packets may be transmitted on a control channel. The second demodulation signals may be used to demodulate the one or more control packets. The second precoding matrix may be computed based, at least in part, on the first channel state information. The one or more control packets may carry scheduling information for the data channel.

The channel state reference signal may be transmitted on the antenna ports used for transmission of the one or more data packets on the data channel. The channel state reference signal may be transmitted on the antenna ports used for transmission of the one or more control packets on the control channel. The channel state information reference signal may be transmitted on both antenna ports used for transmission of the one or more data packets on the data channel and antenna ports used for transmission of the one or more control packets on the control channel. The channel state information reference signals may be used by the wireless device for channel estimation. The wireless device may obtain the first precoding matrix identifier by computing a quality metric for each candidate precoding matrix from the precoding codebook and selecting the identifier of the candidate precoding matrix that results in the largest quality metric. The wireless device may combine the candidate precoding matrix with the estimated channel matrix to obtain a composite channel matrix. The wireless device may use the composite channel matrix to compute the quality metric corresponding to each candidate precoding matrix.

According to some of the various embodiments, a base station may comprise a plurality of carriers. Each of the plurality of carriers may comprise a plurality of OFDM subcarriers. Transmission time may be divided into a plurality of frames. Each frame in the plurality of frames may be further divided into a plurality of subframes. The base station may transmit to a wireless device channel state information reference signals on a first plurality of OFDM subcarriers of a first plurality of OFDM symbols of a first subset of subframes. The base station may receive from the wireless device a first channel state information. The first channel state information may comprise a first precoding matrix identifier. The first channel state information may be computed employing the channel state information reference signals. The base station may transmit to the wireless device first downlink signals on a second plurality of OFDM subcarriers of a second plurality of OFDM symbols of a subframe employing the first precoding matrix identifier.

The first downlink signals may comprise one or more data packets and first demodulation reference signals. The one or more data packets may be transmitted on a data channel. The first demodulation reference signals may be used to demodulate the one or more data packets. The base station may transmit to the wireless device second downlink signals on a third plurality of OFDM subcarriers of a third plurality of OFDM symbols of the subframe employing a second precoding matrix. The second downlink signals may comprise one or more control packets and second demodulation reference signals. The one or more control packets may be transmitted on a control channel. The second demodulation reference signals may be used to demodulate the one or more control packets. The third plurality of OFDM subcarriers may be different from the second plurality of OFDM subcarriers or the third plurality of OFDM symbols may be different from the second plurality of OFDM symbols. The second precoding matrix may be computed based, at least in part, on the first channel state information. The one or more control packets may carry scheduling information for packets transmitted on the data channel. The control channel may carry scheduling information for the data channel.

According to some of the various embodiments, the first demodulation reference signals and the second demodulation reference signals may be transmitted on different antenna ports. The second demodulation reference signals may be transmitted employing a smaller number of antenna ports than the first demodulation reference signals. The second precoding matrix may have smaller number of columns than the first precoding matrix. The second precoding matrix may use smaller number of MIMO layers than the first precodoing matrix. The second precoding matrix may be a submatrix of the first precoding matrix. The second precoding matrix may be a column vector. The second demodulation reference signals may be transmitted from a single antenna port. The second demodulation reference signals may be transmitted from two antenna ports. The second demodulation reference signals may comprise at least two orthogonal reference signals. The one or more control packets may be transmitted employing multi-user MIMO. The base station may transmit one or more second control packets to a second wireless device employing the third plurality of OFDM subcarriers of said third plurality of OFDM symbols of the subframe. The transmission of the one or more second control packets to the second wireless device employing the third plurality of OFDM subcarriers of the third plurality of OFDM symbols of the subframe may use a third precoding matrix.

According to some of the various embodiments, a base station may receive from a wireless device a first channel state information for a data channel. The first channel state information may comprise a first precoding matrix identifier. The base station may receive from the wireless device a second channel state information for a control channel. The second channel state information may comprise a second precoding matrix identifier. The base station may transmit to the wireless device one or more data packets on the data channel employing the first precoding matrix identifier. The base station may transmit to the wireless device one or more control packets on the control channel employing the second precoding matrix identifier. The one or more control packets may carry scheduling information for the data channel.

The first precoding matrix identifier may be an index of a first precoding matrix in a first precoding codebook. The first precoding matrix identifier may be obtained at the wireless device based on maximizing a quality metric such as signal power, signal to noise ratio, signal to noise and interference ratio, channel capacity or achievable data rate, etc. The second precoding matrix identifier may be an index of a second precoding matrix in a second precoding codebook. The second precoding matrix identifier may be obtained at the wireless device based on maximizing a quality metric such as signal power, signal to noise ratio, signal to noise and interference ratio, channel capacity or achievable data rate, etc. The one or more control packets may be transmitted on a subset of antennas ports, and employing a subset of layers used for data transmission. The one or more control packets may be transmitted on a number of virtual antennas that are formed by applying a linear processing on physical antennas.

According to some of the various embodiments, a base station may transmit to a wireless device channel state information reference signals. The base station may receive from the wireless device a first channel state information for a data channel. The first channel state information may comprise a first precoding matrix identifier. The first channel state information may be computed employing the channel state information reference signals. The base station may receive from the wireless device a second channel state information for a control channel. The second channel state information may comprise a second precoding matrix identifier. The second channel state information may be computed employing the channel state information reference signals. The base station may transmit to the wireless device first downlink signals employing the first precoding matrix identifier. The first downlink signals may comprise one or more data packets and first demodulation reference signals. The one or more data packets may be transmitted on the data channel. The first demodulation reference signals may be used to demodulate the one or more data packets. The base station may transmit to the wireless device second downlink signals employing the second precoding matrix identifier. The second downlink signals may comprise one or more control packets and second demodulation reference signals. The one or more control packets may be transmitted on the control channel. The second demodulation reference signals may be used to demodulate the one or more control packets. The one or more control packets may carry scheduling information for the data channel.

The channel state information reference signals may be transmitted on the antenna ports used for transmission of the one or more data packets. The channel state information reference signals may be transmitted on the antenna ports used for transmission of the one or more control packets. The channel state information reference signals may be transmitted on both antenna ports used for transmission of the one or more data packets and antenna ports used for transmission of the one or more control packets. The channel state information reference signals may be used by the wireless device for channel estimation. The wireless device may estimate a channel matrix for the data channel employing the channel state information reference signals. The wireless device may estimate a channel matrix for the control channel employing the channel state information reference signals. The wireless device may obtain the first precoding matrix identifier for the data channel by computing a quality metric for each candidate precoding matrix from the first precoding codebook and selecting the identifier of the candidate precoding matrix that results in the largest quality metric. The wireless device may combine the candidate precoding matrix with the estimated channel matrix for the data channel to obtain a composite channel matrix. The wireless device may use the composite channel matrix to compute the quality metric corresponding to each candidate precoding matrix for the data channel. The wireless device may obtain the second precoding matrix identifier for the control channel by computing a quality metric for each candidate precoding matrix from the second precoding codebook and selecting the identifier of the candidate precoding matrix that results in the largest quality metric. The wireless device may combine the candidate precoding matrix with the estimated channel matrix for the control channel to obtain a composite channel matrix. The wireless device may use the composite channel matrix to compute the quality metric corresponding to each candidate precoding matrix for the control channel.

According to some of the various embodiments, a base station may comprise a plurality of carriers. Each of the plurality of carriers may comprise a plurality of OFDM subcarriers. Transmission time may be divided into a plurality of frames. Each frame in the plurality of frames may further be divided into a plurality of subframes. The base station may transmit to a wireless device channel state information reference signals on a first plurality of OFDM subcarriers of a first plurality of OFDM symbols of a first subset of subframes. The base station may receive from the wireless device a first channel state information for a data channel. The first channel state information may comprise a first precoding matrix identifier. The first channel state information may be computed employing the channel state information reference signals. The base station may receive from the wireless device a second channel state information for a data channel. The second channel state information may comprise a second precoding matrix identifier. The second channel state information may be computed employing the channel state information reference signals. The base station may transmit to the wireless device first downlink signals on a second plurality of OFDM subcarriers of a second plurality of OFDM symbols of a subframe employing the first precoding matrix identifier. The first downlink signals may comprise one or more data packets and first demodulation reference signals The one or more data packets may be transmitted on the data channel. The first demodulation reference signals may be used to demodulate the one or more data packets. The base station may transmit to the wireless device second downlink signals on a third plurality of OFDM subcarriers of a third plurality of OFDM symbols of the subframe employing the second precoding matrix identifier. The second downlink signals may comprise one or more control packets and second demodulation reference signals The one or more control packets may be transmitted on the control channel. The third plurality of OFDM subcarriers may be different from the second plurality of OFDM subcarriers or the third plurality of OFDM symbols may be different from the second plurality of OFDM symbols. The second demodulation signals may be used to demodulate the one or more control packets. The one or more control packets may carry scheduling information for the data channel.

According to some of the various embodiments, a wireless device may transmit to a base station a first channel state information for a data channel. The first channel state information may comprise a first precoding matrix identifier. The wireless device may transmit to the base station a second channel state information for a control channel. The second channel state information may comprise a second precoding matrix identifier. The wireless device may receive from the base station one or more data packets on the data channel employing the first precoding matrix identifier. The wireless device may receive from the base station one or more control packets on the control channel employing the second precoding matrix. The one or more control packets may carry scheduling information for the data channel.

According to some of the various embodiments, a communication network may comprise a plurality of carriers. Each of the plurality of carriers may comprise a plurality of OFDM subcarriers. Transmission time may be divided into a plurality of frames. Each frame in the plurality of frames may further be divided into a plurality of subframes. The wireless device may receive from a base station channel state information reference signals on a first plurality of OFDM subcarriers of a first plurality of OFDM symbols of a first subset of subframes. The wireless device may transmit to the base station a first channel state information for a data channel. The first channel state information may comprise a first precoding matrix identifier. The first channel state information may be computed employing the channel state information reference signals. The wireless device may transmit to the base station a second channel state information for a data channel. The second channel state information may comprise a second precoding matrix identifier. The second channel state information may be computed employing the channel state information reference signals. The wireless device may receive from the base station first downlink signals on a second plurality of OFDM subcarriers of a second plurality of OFDM symbols of a subframe employing the first precoding matrix identifier. The first downlink signals may comprise one or more data packets and first demodulation reference signals The one or more data packets may be transmitted on the data channel. The first demodulation reference signals may be used to demodulate the one or more data packets. The wireless device may receive from the base station second downlink signals on a third plurality of OFDM subcarriers of a third plurality of OFDM symbols of the subframe employing the second precoding matrix identifier. The second downlink signals may comprise one or more control packets and second demodulation reference signals The one or more control packets may be transmitted on the control channel. The third plurality of OFDM subcarriers may be different from the second plurality of OFDM subcarriers or the third plurality of OFDM symbols may be different from the second plurality of OFDM symbols. The second demodulation signals may be used to demodulate the one or more control packets. The one or more control packets may carry scheduling information for the data channel.

According to some of the various embodiments, the control channel and the data channel may be transmitted on the same carrier. The control channel and the data channel may be transmitted multiplexed in time. The control channel and the data channel may be transmitted multiplexed in frequency. The control channel and the data channel may be transmitted multiplexed employing OFDM resources of the same carrier. The first demodulation reference signals and the second demodulation reference signals may be transmitted on different antenna ports. The second demodulation reference signals may be transmitted employing a smaller number of antenna ports than the first demodulation reference signals. The second precoding matrix may have smaller number of columns than the first precoding matrix. The second precoding matrix may use smaller number of MIMO layers than the first precodoing matrix.

The second precoding matrix may be a submatrix of the first precoding matrix. The second precoding matrix may be a column vector. The second demodulation reference signals may be transmitted from a single antenna port. The second demodulation reference signals may be transmitted from two antenna ports. The second demodulation reference signals may comprise at least two orthogonal reference signals. The one or more control packets may be transmitted employing multi-user MIMO. One or more second control packets may be transmitted to a second wireless device employing the third plurality of OFDM subcarriers of the third plurality of OFDM symbols of the subframe. The transmission of the one or more second control packets to the second wireless device employing the third plurality of OFDM subcarriers of the third plurality of OFDM symbols of the subframe may use a third precoding matrix. The channel state information reference signal may be transmitted on antenna ports used for transmission of the one or more data packets and the one or more control packets. The first channel state information may be computed employing the channel state information reference signals on antenna ports used for transmission of the one or more data packets. The second channel state information may be computed employing the channel state information reference signals on antenna ports used for transmission of the one or more control packets.

The proposed transmission and reception mechanism introduced in the example embodiments of this invention enable the transmitter to increase bandwidth efficiency in the system by efficiently employing control and data radio resources. The proposed transmission and reception mechanisms provide a method for transmission of reference signals and channel feedback that increases system efficiency. A second carrier may be used to provide additional capacity. In the example embodiments, the second carrier may not carry some of the physical channels, which are required for example in LTE release 8, 9 and 10. This is one of the advantages compared with existing technologies. The configuration information and synchronization signals may be transmitted employing the first carrier, and this could improve system efficiency.

According to some of the various aspects of embodiments, the packets in the downlink may be transmitted via downlink physical channels. The carrying packets in the uplink may be transmitted via uplink physical channels. The baseband data representing a downlink physical channel may be defined in terms of at least one of the following actions: scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on layer(s) for transmission on the antenna port(s); mapping of complex-valued modulation symbols for antenna port(s) to resource elements; and/or generation of complex-valued time-domain OFDM signal(s) for antenna port(s).

Codeword, transmitted on the physical channel in one subframe, may be scrambled prior to modulation, resulting in a block of scrambled bits. The scrambling sequence generator may be initialized at the start of subframe(s). Codeword(s) may be modulated using QPSK, 16QAM, 64QAM, 128QAM, and/or the like resulting in a block of complex-valued modulation symbols. The complex-valued modulation symbols for codewords to be transmitted may be mapped onto one or several layers. For transmission on a single antenna port, a single layer may be used. For spatial multiplexing, the number of layers may be less than or equal to the number of antenna port(s) used for transmission of the physical channel. The case of a single codeword mapped to multiple layers may be applicable when the number of cell-specific reference signals is four or when the number of UE-specific reference signals is two or larger. For transmit diversity, there may be one codeword and the number of layers may be equal to the number of antenna port(s) used for transmission of the physical channel.

The precoder may receive a block of vectors from the layer mapping and generate a block of vectors to be mapped onto resources on the antenna port(s). Precoding for spatial multiplexing using antenna port(s) with cell-specific reference signals may be used in combination with layer mapping for spatial multiplexing. Spatial multiplexing may support two or four antenna ports and the set of antenna ports used may be $\{0,1\}$ or $\{0, 1, 2, 3\}$. Precoding for transmit diversity may be used in combination with layer mapping for transmit diversity. The precoding operation for transmit diversity may be defined for two and four antenna ports. Precoding for spatial multiplexing using antenna ports with UE-specific reference signals may also, for example, be used in combination with layer mapping for spatial multiplexing. Spatial multiplexing using antenna ports with UE-specific reference signals may support up to eight antenna ports. Reference signals may be pre-defined signals that may be used by the receiver for decoding the received physical signal, estimating the channel state, and/or other purposes.

For antenna port(s) used for transmission of the physical channel, the block of complex-valued symbols may be mapped in sequence to resource elements. In resource blocks in which UE-specific reference signals are not transmitted the PDSCH may be transmitted on the same set of antenna ports as the physical broadcast channel in the downlink (PBCH). In resource blocks in which UE-specific reference signals are transmitted, the PDSCH may be transmitted, for example, on antenna port(s) $\{5, \{7\}, \{8\}, \text{or} \{7, 8, \ldots, v+6\}$, where v is the number of layers used for transmission of the PDSCH.

Common reference signal(s) may be transmitted in physical antenna port(s). Common reference signal(s) may be cell-specific reference signal(s) (RS) used for demodulation and/or measurement purposes. Channel estimation accuracy using common reference signal(s) may be reasonable for demodulation (high RS density). Common reference signal(s) may be defined for LTE technologies, LTE-advanced technologies, and/or the like. Demodulation reference signal(s) may be transmitted in virtual antenna port(s) (i.e., layer or stream). Channel estimation accuracy using demodulation reference signal(s) may be reasonable within allocated time/frequency resources. Demodulation reference signal(s) may be defined for LTE-advanced technology and may not be applicable to LTE technology. Measurement reference signal(s), may also called CSI (channel state information) reference signal(s), may be transmitted in physical antenna port(s) or virtualized antenna port(s). Measurement reference signal(s) may be Cell-specific RS used for measurement purposes. Channel estimation accuracy may be relatively lower than demodulation RS. CSI reference signal(s) may be defined for LTE-advanced technology and may not be applicable to LTE technology.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

Element(s) in a resource grid may be called a resource element. A physical resource block may be defined as N consecutive SC-FDMA symbols in the time domain and/or M consecutive subcarriers in the frequency domain, wherein M and N may be pre-defined integer values. Physical resource block(s) in uplink(s) may comprise of M×N resource elements. For example, a physical resource block may correspond to one slot in the time domain and 180 kHz in the frequency domain. Baseband signal(s) representing the physical uplink shared channel may be defined in terms of: a) scrambling, b) modulation of scrambled bits to generate complex-valued symbols, c) mapping of complex-valued modulation symbols onto one or several transmission layers, d) transform precoding to generate complex-valued symbols, e) precoding of complex-valued symbols, f) mapping of precoded complex-valued symbols to resource elements, g) generation of complex-valued time-domain SC-FDMA signal(s) for antenna port(s), and/or the like.

For codeword(s), block(s) of bits may be scrambled with UE-specific scrambling sequence(s) prior to modulation, resulting in block(s) of scrambled bits. Complex-valued modulation symbols for codeword(s) to be transmitted may be mapped onto one, two, or more layers. For spatial multiplexing, layer mapping(s) may be performed according to pre-defined formula (s). The number of layers may be less than or equal to the number of antenna port(s) used for transmission of physical uplink shared channel(s). The example of a single codeword mapped to multiple layers may be applicable when the number of antenna port(s) used for PUSCH is, for example, four. For layer(s), the block of complex-valued symbols may be divided into multiple sets, each corresponding to one SC-FDMA symbol. Transform precoding may be applied. For antenna port(s) used for transmission of the PUSCH in a subframe, block(s) of complex-valued symbols may be multiplied with an amplitude scaling factor in order to conform to a required transmit power, and mapped in sequence to physical resource block(s) on antenna port(s) and assigned for transmission of PUSCH.

According to some of the various embodiments, data may arrive to the coding unit in the form of two transport blocks every transmission time interval (TTI) per UL cell. The following coding actions may be identified for transport block(s) of an uplink carrier: a) Add CRC to the transport block, b) Code block segmentation and code block CRC attachment, c) Channel coding of data and control information, d) Rate matching, e) Code block concatenation. f) Multiplexing of data and control information, g) Channel interleaver, h) Error detection may be provided on UL-SCH (uplink shared channel) transport block(s) through a Cyclic Redundancy Check (CRC), and/or the like. Transport block(s) may be used to calculate CRC parity bits. Code block(s) may be delivered to channel coding block(s). Code block(s) may be individually turbo encoded. Turbo coded block(s) may be delivered to rate matching block(s).

Physical uplink control channel(s) (PUCCH) may carry uplink control information. Simultaneous transmission of PUCCH and PUSCH from the same UE may be supported if enabled by higher layers. For a type 2 frame structure, the PUCCH may not be transmitted in the UpPTS field. PUCCH may use one resource block in each of the two slots in a subframe. Resources allocated to UE and PUCCH configuration(s) may be transmitted via control messages. PUCCH may comprise: a) positive and negative acknowledgements for data packets transmitted at least one downlink carrier, b) channel state information for at least one downlink carrier, c) scheduling request, and/or the like.

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards. Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identit(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various aspects of embodiments, the sequence used for a primary synchronization signal may be generated from a frequency-domain Zadoff-Chu sequence according to a pre-defined formula. A Zadoff-Chu root sequence index may also be predefined in a specification. The mapping of the sequence to resource elements may depend on a frame structure. The wireless device may not assume that the primary synchronization signal is transmitted on the same antenna port as any of the downlink reference signals. The wireless device may not assume that any transmission instance of the primary synchronization signal is transmitted on the same antenna port, or ports, used for any other transmission instance of the primary synchronization signal. The sequence may be mapped to the resource elements according to a predefined formula.

For FDD frame structure, a primary synchronization signal may be mapped to the last OFDM symbol in slots 0 and 10. For TDD frame structure, the primary synchronization signal may be mapped to the third OFDM symbol in subframes 1 and 6. Some of the resource elements allocated to primary or secondary synchronization signals may be reserved and not used for transmission of the primary synchronization signal.

According to some of the various aspects of embodiments, the sequence used for a secondary synchronization signal may be an interleaved concatenation of two length-31 binary sequences. The concatenated sequence may be scrambled with a scrambling sequence given by a primary synchronization signal. The combination of two length-31 sequences defining the secondary synchronization signal may differ between subframe 0 and subframe 5 according to predefined formula (s). The mapping of the sequence to resource elements may depend on the frame structure. In a subframe for FDD frame structure and in a half-frame for TDD frame structure, the same antenna port as for the primary synchronization signal may be used for the secondary synchronization signal. The sequence may be mapped to resource elements according to a predefined formula.

Example embodiments for the physical channels configuration will now be presented. Other examples may also be possible. A physical broadcast channel may be scrambled with a cell-specific sequence prior to modulation, resulting in a block of scrambled bits. PBCH may be modulated using QPSK, and/or the like. The block of complex-valued symbols for antenna port(s) may be transmitted during consecutive radio frames, for example, four consecutive radio frames. In some embodiments the PBCH data may arrive to the coding unit in the form of a one transport block every transmission time interval (TTI) of 40 ms. The following coding actions may be identified. Add CRC to the transport block, channel coding, and rate matching. Error detection may be provided on PBCH transport blocks through a Cyclic Redundancy Check (CRC). The transport block may be used to calculate the CRC parity bits. The parity bits may be computed and attached to the BCH (broadcast channel) transport block. After the attachment, the CRC bits may be scrambled according to the transmitter transmit antenna configuration. Information bits may be delivered to the channel coding block and they may be tail biting convolutionally encoded. A tail biting convolutionally coded block may be delivered to the rate matching block. The coded block may be rate matched before transmission.

A master information block may be transmitted in PBCH and may include system information transmitted on broadcast channel(s). The master information block may include downlink bandwidth, system frame number(s), and PHICH (physical hybrid-ARQ indicator channel) configuration. Downlink bandwidth may be the transmission bandwidth configuration, in terms of resource blocks in a downlink, for example 6 may correspond to 6 resource blocks, 15 may correspond to 15 resource blocks and so on. System frame number(s) may define the N (for example N=8) most significant bits of the system frame number. The M (for example M=2) least significant bits of the SFN may be acquired implicitly in the PBCH decoding. For example, timing of a 40 ms PBCH TTI may indicate 2 least significant bits (within 40 ms PBCH TTI, the first radio frame: 00, the second radio frame: 01, the third radio frame: 10, the last radio frame: 11). One value may apply for other carriers in the same sector of a base station (the associated functionality is common (e.g. not performed independently for each cell). PHICH configuration(s) may include PHICH duration, which may be normal (e.g. one symbol duration) or extended (e.g. 3 symbol duration).

Physical control format indicator channel(s) (PCFICH) may carry information about the number of OFDM symbols used for transmission of PDCCHs (physical downlink control channel) in a subframe. The set of OFDM symbols possible to use for PDCCH in a subframe may depend on many parameters including, for example, downlink carrier bandwidth, in terms of downlink resource blocks. PCFICH transmitted in one subframe may be scrambled with cell-specific sequence(s) prior to modulation, resulting in a block of scrambled bits. A scrambling sequence generator(s) may be initialized at the start of subframe(s). Block (s) of scrambled bits may be modulated using QPSK. Block(s) of modulation symbols may be mapped to at least one layer and precoded resulting in a block of vectors representing the signal for at least one antenna port. Instances of PCFICH control channel(s) may indicate one of several (e.g. 3) possible values after being decoded. The range of possible values of instance(s) of the first control channel may depend on the first carrier bandwidth.

According to some of the various embodiments, physical downlink control channel(s) may carry scheduling assignments and other control information. The number of resource-elements not assigned to PCFICH or PHICH may be assigned to PDCCH. PDCCH may support multiple formats. Multiple PDCCH packets may be transmitted in a subframe. PDCCH may be coded by tail biting convolutionally encoder before transmission. PDCCH bits may be scrambled with a cell-specific sequence prior to modulation, resulting in block(s) of scrambled bits. Scrambling sequence generator(s) may be initialized at the start of subframe(s). Block(s) of scrambled bits may be modulated using QPSK. Block(s) of modulation symbols may be mapped to at least one layer and precoded resulting in a block of vectors representing the signal for at least one antenna port. PDCCH may be transmitted on the same set of antenna ports as the PBCH, wherein PBCH is a physical broadcast channel broadcasting at least one basic system information field.

According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. OFDM subcarriers that are allocated for transmission of PDCCH may occupy the bandwidth of downlink carrier(s). PDCCH channel(s) may carry a plurality of downlink control packets in subframe(s). PDCCH may be transmitted on downlink carrier(s) starting from the first OFDM symbol of subframe(s), and may occupy up to multiple symbol duration(s) (e.g. 3 or 4).

According to some of the various embodiments, PHICH may carry the hybrid-ARQ (automatic repeat request) ACK/NACK. Multiple PHICHs mapped to the same set of resource elements may constitute a PHICH group, where PHICHs within the same PHICH group may be separated through different orthogonal sequences. PHICH resource(s) may be identified by the index pair (group, sequence), where group(s) may be the PHICH group number(s) and sequence(s) may be the orthogonal sequence index within the group(s). For frame structure type 1, the number of PHICH groups may depend on parameters from higher layers (RRC). For frame structure type 2, the number of PHICH groups may vary between downlink subframes according to a pre-defined arrangement. Block(s) of bits transmitted on one PHICH in one subframe may be modulated using BPSK or QPSK, resulting in a block(s) of complex-valued modulation symbols. Block(s) of modulation symbols may be symbol-wise multiplied with an orthogonal sequence and scrambled, resulting in a sequence of modulation symbols Other arrangements for PCFICH, PHICH, PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

According to some of the various aspects of embodiments, a random access procedure may be initiated by a physical downlink control channel (PDCCH) order and/or by the MAC sublayer in a wireless device. If a wireless device receives a PDCCH transmission consistent with a PDCCH order masked with its radio identifier, the wireless device may initiate a random access procedure. Preamble transmission(s) on physical random access channel(s) (PRACH) may be supported on a first uplink carrier and reception of a PDCCH order may be supported on a first downlink carrier.

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a first downlink carrier for random access response(s), in a random access response window. There may be a pre-known identifier in PDCCH that indentifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may include a configurable timer (timeAlignmentTimer) that may be used to control how long the wireless device is considered uplink time aligned. When a timing alignment command MAC control element is received, the wireless device may apply the timing alignment command and start or restart timeAlignmentTimer. The wireless device may not perform any uplink transmission except the random access preamble transmission when timeAlignmentTimer is not running or when it exceeds its limit. The time alignment command may substantially align frame and subframe reception timing of a first uplink carrier and at least one additional uplink carrier. According to some of the various aspects of embodiments, the time alignment command value range employed during a random access process may be substantially larger than the time alignment command value range during active data transmission. In an example embodiment, uplink transmission timing may be maintained on a per time alignment group (TAG) basis. Carrier(s) may be grouped in TAGs, and TAG(s) may have their own downlink timing reference, time alignment timer, and/or time alignment commands. Group(s) may have their own random access process. Time alignment commands may be directed to a time alignment group. The TAG, including the primary cell may be called a primary TAG (pTAG) and the TAG not including the primary cell may be called a secondary TAG (sTAG).

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

According to some of the various aspects of embodiments, data packet(s) may be encrypted before transmission to secure packet(s) from unwanted receiver(s). Desired recipient(s) may be able to decrypt the packet(s). A first plurality of data packet(s) and/or a second plurality of data packet(s) may be encrypted using an encryption key and at least one parameter that may change substantially rapidly over time. The encryption mechanism may provide a transmission that may not be easily eavesdropped by unwanted receivers. The encryption mechanism may include additional parameter(s) in an encryption module that changes substantially rapidly in time to enhance the security mechanism. Example varying parameter(s) may comprise various types of system counter(s), such as system frame number. Substantially rapidly may for example imply changing on a per subframe, frame, or group of subframes basis. Encryption may be provided by a PDCP layer between the transmitter and receiver, and/or may be provided by the application layer. Additional overhead added to packet(s) by lower layers such as RLC, MAC, and/or Physical layer may not be encrypted before transmission. In the receiver, the plurality of encrypted data packet(s) may be decrypted using a first decryption key and at least one first parameter. The plurality of data packet(s) may be decrypted using an additional parameter that changes substantially rapidly over time.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier, CQI (channel quality indicator)/PMI (precoding matrix indicator)/RI(ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer.

According to some of the various aspects of embodiments, subcarriers and/or resource blocks may comprise a plurality of physical subcarriers and/or resource blocks. In another example embodiment, subcarriers may be a plurality of virtual and/or logical subcarriers and/or resource blocks.

According to some of the various aspects of embodiments, a radio bearer may be a GBR (guaranteed bit rate) bearer and/or a non-GBR bearer. A GBR and/or guaranteed bit rate bearer may be employed for transfer of real-time packets, and/or a non-GBR bearer may be used for transfer of non-real-time packets. The non-GBR bearer may be assigned a plurality of attributes including: a scheduling priority, an allocation and retention priority, a portable device aggregate maximum bit rate, and/or the like. These parameters may be used by the scheduler in scheduling non-GBR packets. GBR bearers may be assigned attributes such as delay, jitter, packet loss parameters, and/or the like.

According to some of the various aspects of embodiments, subcarriers may include data subcarrier symbols and pilot subcarrier symbols. Pilot symbols may not carry user data, and may be included in the transmission to help the receiver to perform synchronization, channel estimation and/or signal quality detection. Base stations and wireless devices (wireless receiver) may use different methods to generate and transmit pilot symbols along with information symbols.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like. According to some of the various aspects of embodiments of the present invention, layer 1 (physical layer) may be based on OFDMA or SC-FDMA. Time may be divided into frame(s) with fixed duration. Frame(s) may be divided into substantially equally sized subframes, and subframe(s) may be divided into substantially equally sized slot(s). A plurality of OFDM or SC-FDMA symbol(s) may be transmitted in slot(s). OFDMA or SC-FDMA symbol(s) may be grouped into resource block(s). A scheduler may assign resource(s) in resource block unit(s), and/or a group of resource block unit(s). Physical resource block(s) may be resources in the physical layer, and logical resource block(s) may be resource block(s) used by the MAC layer. Similar to virtual and physical subcarriers, resource block(s) may be mapped from logical to physical resource block(s). Logical resource block(s) may be contiguous, but corresponding physical resource block(s) may be non-contiguous. Some of the various embodiments of the present invention may be implemented at the physical or logical resource block level(s).

According to some of the various aspects of embodiments, layer 2 transmission may include PDCP (packet data convergence protocol), RLC (radio link control), MAC (media access control) sub-layers, and/or the like. MAC may be responsible for the multiplexing and mapping of logical channels to transport channels and vice versa. A MAC layer may perform channel mapping, scheduling, random access channel procedures, uplink timing maintenance, and/or the like.

According to some of the various aspects of embodiments, the MAC layer may map logical channel(s) carrying RLC PDUs (packet data unit) to transport channel(s). For transmission, multiple SDUs (service data unit) from logical channel(s) may be mapped to the Transport Block (TB) to be sent over transport channel(s). For reception, TBs from transport channel(s) may be demultiplexed and assigned to corresponding logical channel(s). The MAC layer may perform scheduling related function(s) in both the uplink and downlink and thus may be responsible for transport format selection associated with transport channel(s). This may include HARQ functionality. Since scheduling may be done at the base station, the MAC layer may be responsible for reporting scheduling related information such as UE (user equipment or wireless device) buffer occupancy and power headroom. It may also handle prioritization from both an inter-UE and intra-UE logical channel perspective. MAC may also be responsible for random access procedure(s) for the uplink that may be performed following either a contention and non-contention based process. UE may need to maintain timing synchronization with cell(s). The MAC layer may perform procedure(s) for periodic synchronization.

According to some of the various aspects of embodiments, the MAC layer may be responsible for the mapping of multiple logical channel(s) to transport channel(s) during transmission(s), and demultiplexing and mapping of transport channel data to logical channel(s) during reception. A MAC PDU may include of a header that describes the format of the PDU itself, which may include control element(s), SDUs, Padding, and/or the like. The header may be composed of multiple sub-headers, one for constituent part(s) of the MAC PDU. The MAC may also operate in a transparent mode, where no header may be pre-pended to the PDU. Activation command(s) may be inserted into packet(s) using a MAC control element.

According to some of the various aspects of embodiments, the MAC layer in some wireless device(s) may report buffer size(s) of either a single Logical Channel Group (LCG) or a group of LCGs to a base station. An LCG may be a group of logical channels identified by an LCG ID. The mapping of logical channel(s) to LCG may be set up during radio configuration. Buffer status report(s) may be used by a MAC scheduler to assign radio resources for packet transmission from wireless device(s). HARQ and ARQ processes may be used for packet retransmission to enhance the reliability of radio transmission and reduce the overall probability of packet loss.

According to some of the various aspects of embodiments, an RLC sub-layer may control the applicability and functionality of error correction, concatenation, segmentation, re-segmentation, duplicate detection, in-sequence delivery, and/or the like. Other functions of RLC may include protocol error detection and recovery, and/or SDU discard. The RLC sub-layer may receive data from upper layer radio bearer(s) (signaling and data) called service data unit(s) (SDU). The transmission entities in the RLC layer may convert RLC SDUs to RLC PDU after performing functions such as segmentation, concatenation, adding RLC header(s), and/or the like. In the other direction, receiving entities may receive RLC PDUs from the MAC layer. After performing reordering, the PDUs may be assembled back into RLC SDUs and delivered to the upper layer. RLC interaction with a MAC layer may include: a) data transfer for uplink and downlink through logical channel(s); b) MAC notifies RLC when a transmission opportunity becomes available, including the size of total number of RLC PDUs that may be transmitted in the current transmission opportunity, and/or c) the MAC entity at the transmitter may inform RLC at the transmitter of HARQ transmission failure.

According to some of the various aspects of embodiments, PDCP (packet data convergence protocol) may comprise a layer 2 sub-layer on top of RLC sub-layer. The PDCP may be responsible for a multitude of functions. First, the PDCP layer may transfer user plane and control plane data to and from upper layer(s). PDCP layer may receive SDUs from upper layer(s) and may send PDUs to the lower layer(s). In other direction, PDCP layer may receive PDUs from the lower layer(s) and may send SDUs to upper layer(s). Second, the PDCP may be responsible for security functions. It may apply ciphering (encryption) for user and control plane bearers, if configured. It may also perform integrity protection for control plane bearer(s), if configured. Third, the PDCP may perform header compression service(s) to improve the efficiency of over the air transmission. The header compression may be based on robust header compression (ROHC). ROHC may be performed on VOIP packets. Fourth, the PDCP may be responsible for in-order delivery of packet(s) and duplicate detection service(s) to upper layer(s) after handover(s). After handover, the source base station may transfer unacknowledged packet(s)s to target base station when operating in RLC acknowledged mode (AM). The target base station may forward packet(s)s received from the source base station to the UE (user equipment).

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/ simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
   receiving, by a base station and from a wireless device, first channel state information (CSI) comprising a first precoding matrix indicator;
   determining, by the base station and based at least in part on the first precoding matrix indicator, a first precoding matrix for transmission of a downlink data channel to the wireless device;
   determining, by the base station and based at least in part on the first precoding matrix indicator, a second precoding matrix for transmission of a downlink control channel to the wireless device, wherein the second precoding matrix is different from the first precoding matrix, and wherein the downlink control channel is associated with the downlink data channel;
   transmitting, to the wireless device and in a subframe, the downlink data channel using the first precoding matrix and transmitting at least one first reference signal associated with the downlink data channel; and
   transmitting, to the wireless device and in the subframe, the downlink control channel using the second precoding matrix and transmitting at least one second reference signal associated with the downlink control channel.

2. The method of claim 1, wherein:
   the transmitting the downlink data channel comprises transmitting the downlink data channel via a first plurality of orthogonal frequency division multiplexed (OFDM) subcarriers, and
   the transmitting the downlink control channel comprises transmitting the downlink control channel via a second plurality of OFDM subcarriers that is different from the first plurality of OFDM subcarriers.

3. The method of claim 2, further comprising transmitting one or more control packets to a second wireless device via a third plurality of OFDM subcarriers of the subframe.

4. The method of claim 1, wherein the transmitting the at least one second reference signal associated with the downlink control channel employs a smaller number of antenna ports than the transmitting the at least one first reference signal associated with the downlink data channel.

5. The method of claim 1, wherein the second precoding matrix employs a smaller number of multiple-input-multiple-output (MIMO) layers than the first precoding matrix.

6. The method of claim 1, wherein the second precoding matrix is a column vector.

7. The method of claim 1, wherein the at least one second reference signal associated with the downlink control channel comprises at least two orthogonal reference signals.

8. The method of claim 1, further comprising transmitting, via the downlink control channel and employing multiple user multiple-input-multiple-output (MIMO), one or more control packets.

9. The method of claim 1, wherein the second precoding matrix is a submatrix of the first precoding matrix.

10. The method of claim 1, wherein the second precoding matrix is based, at least in part, on a linear transformation on a subset of rows and columns of the first precoding matrix.

11. The method of claim 1, wherein the first CSI further comprises one or more of a channel quality indicator (CQI) or a rank indicator (RI).

12. A base station comprising:
   one or more processors; and
   memory storing instructions that, when executed, cause the base station to:
   receive, from a wireless device, first channel state information comprising a first precoding matrix indicator;
   determine, based at least in part on the first precoding matrix indicator, a second precoding matrix for transmission of a downlink control channel to the wireless device, wherein the second precoding matrix is different from a first precoding matrix indicated by the first precoding matrix indicator;
   transmit, to the wireless device, in a subframe, and employing the first precoding matrix, one or more data packets via a downlink data channel and transmit at least one first reference signal associated with the downlink data channel; and
   transmit, to the wireless device, in the subframe, and employing the second precoding matrix, one or more control packets via the downlink control channel and transmit at least one second reference signal associated with the downlink control channel, wherein the downlink control channel carries scheduling information for the downlink data channel.

13. The base station of claim 12, wherein the instructions, when executed, cause the base station to transmit, via the downlink control channel and employing multiple user multiple-input-multiple-output (MIMO), the one or more control packets.

14. The base station of claim 12, wherein the second precoding matrix has a smaller number of columns than the first precoding matrix.

15. The base station of claim 12, wherein the second precoding matrix employs a smaller number of multiple-input-multiple-output (MIMO) layers than the first precoding matrix.

16. The base station of claim 12, wherein the second precoding matrix is a submatrix of the first precoding matrix.

17. A method comprising:
   transmitting, by a wireless device and to a base station, first channel state information (CSI) comprising a first precoding matrix indicator;
   receiving, by the wireless device, at least one first demodulation reference signal corresponding to a downlink data channel that is precoded using a first precoding matrix indicated by the first precoding matrix indicator;
   receiving, by the wireless device, at least one second demodulation reference signal corresponding to a downlink control channel that is associated with the downlink data channel and that is precoded using a second precoding matrix that is based, at least in part, on the first precoding matrix indicator;
   receiving, by the wireless device and from the base station, in a subframe, the downlink data channel; and
   receiving, by the wireless device and from the base station, in the subframe, the downlink control channel.

18. The method of claim 17, wherein:
   the receiving the downlink data channel comprises receiving the downlink data channel via a first plurality of orthogonal frequency division multiplexed (OFDM) subcarriers, and
   the receiving the downlink control channel comprises receiving the downlink control channel via a second plurality OFDM subcarriers that is different from the first plurality of OFDM subcarriers.

19. The method of claim 17, wherein the at least one second demodulation reference signal comprises at least two orthogonal reference signals.

20. The method of claim 17, wherein the second precoding matrix employs a smaller number of multiple-input-multiple-output (MIMO) layers than the first precoding matrix.

21. The method of claim 17, wherein the second precoding matrix is a column vector.

22. The method of claim 17, further comprising receiving one or more control packets that were transmitted employing multi-user multiple-input-multiple-output (MIMO) in the downlink control channel.

23. The method of claim 17, wherein the first CSI further comprises one or more of a channel quality indicator (CQI) or a rank indicator (RI).

24. The method of claim 17, wherein the second precoding matrix is a submatrix of the first precoding matrix.

25. A wireless device comprising:
one or more processors; and
memory storing instructions that, when executed by the one or more processors, cause the wireless device to:
transmit, by the wireless device and to a base station, first channel state information (CSI) comprising a first precoding matrix indicator;
receive, by the wireless device, at least one first demodulation reference signal corresponding to a downlink data channel that is precoded using a first precoding matrix indicated by the first precoding matrix indicator;
receive, by the wireless device, at least one second demodulation reference signal corresponding to a downlink control channel that is associated with the downlink data channel and that is precoded using a second precoding matrix that is based, at least in part, on the first precoding matrix indicator;
receive, by the wireless device and from the base station, in a subframe, the downlink data channel; and
receive, by the wireless device and from the base station, in the subframe, the downlink control channel.

26. The wireless device of claim 25, wherein the instructions that, when executed by the one or more processors, cause the wireless device to receive the downlink data channel further cause the wireless device to receive the downlink data channel via a first plurality of orthogonal frequency division multiplexed (OFDM) subcarriers; and
wherein the instructions that, when executed by the one or more processors, cause the wireless device to receive the downlink control channel further cause the wireless device to receive the downlink control channel via a second plurality of OFDM subcarriers different from the first plurality of OFDM subcarriers.

27. The wireless device of claim 25, wherein the at least one second demodulation reference signal comprises at least two orthogonal reference signals.

28. The wireless device of claim 25, wherein the second precoding matrix employs a smaller number of multiple-input-multiple-output (MIMO) layers than the first precoding matrix.

29. The wireless device of claim 25, wherein the second precoding matrix is a column vector.

30. The wireless device of claim 25, wherein the instructions further comprise instructions that, when executed by the one or more processors, cause the wireless device to receive one or more control packets that were transmitted employing multi-user multiple-input-multiple-output (MIMO) in the downlink control channel.

31. The wireless device of claim 25, wherein the first CSI further comprises one or more of a channel quality indicator (CQI) or a rank indicator (RI).

32. The wireless device of claim 25, wherein the second precoding matrix is a submatrix of the first precoding matrix.

33. A base station comprising:
one or more processors; and
memory storing instructions that, when executed, cause the base station to:
receive, from a wireless device, first channel state information (CSI) comprising a first precoding matrix indicator;
determine, based at least in part on the first precoding matrix indicator, a first precoding matrix for transmission of a downlink data channel to the wireless device;
determine, based at least in part on the first precoding matrix indicator, a second precoding matrix for transmission of a downlink control channel to the wireless device, wherein the second precoding matrix is different from the first precoding matrix, and wherein the downlink control channel is associated with the downlink data channel;
transmit, to the wireless device and in a subframe, the downlink data channel using the first precoding matrix and transmit at least one first reference signal associated with the downlink data channel; and
transmit, to the wireless device and in the subframe, the downlink control channel using the second precoding matrix and transmit at least one second reference signal associated with the downlink control channel.

34. The base station of claim 33, wherein the instructions that, when executed, cause the base station to transmit the downlink data channel further cause the base station to transmit the downlink data channel via a first plurality of orthogonal frequency division multiplexed (OFDM) subcarriers; and
wherein the instructions that, when executed, cause the base station to transmit the downlink control channel further cause the base station to transmit the downlink control channel via a second plurality of OFDM subcarriers, different from the first plurality of OFDM subcarriers.

35. The base station of claim 34, wherein the instructions that, when executed, cause the base station to transmit the at least one second reference signal associated with the downlink control channel further cause the base station to transmit the least one second reference signal employing a smaller number of antenna ports than the at least one first reference signal associated with the downlink data channel.

36. The base station of claim 34, wherein the memory further stores instructions that, when executed, cause the base station to transmit one or more control packets to a second wireless device via a third plurality of OFDM subcarriers of the subframe.

37. The base station of claim 33, wherein the second precoding matrix employs a smaller number of multiple-input-multiple-output (MIMO) layers than the first precoding matrix.

38. The base station of claim 33, wherein the second precoding matrix is a column vector.

39. The base station of claim 33, wherein the at least one second reference signal associated with the downlink control channel comprises at least two orthogonal reference signals.

40. The base station of claim 33, wherein the memory further stores instructions that, when executed, cause the base station to transmit one or more control packets employing multi-user multiple-input-multiple-output (MIMO) in the downlink control channel.

41. The base station of claim 33, wherein the second precoding matrix is a submatrix of the first precoding matrix.

42. The base station of claim 33, wherein the first CSI further comprises one or more of a channel quality indicator (CQI) or a rank indicator (RI).

43. A method comprising:
receiving, by a base station and from a wireless device, first channel state information (CSI) comprising a first precoding matrix indicator;
determining, by the base station and based at least in part on the first precoding matrix indicator, a first precoding matrix for transmission of a downlink data channel to the wireless device;
determining, by the base station and based at least in part on the first precoding matrix indicator, a second precoding matrix for transmission of a downlink control channel to the wireless device, wherein the downlink control channel is associated with the downlink data channel;
transmitting, by the base station, to the wireless device, in a subframe, and using the first precoding matrix, the downlink data channel, wherein the downlink data channel comprises at least one first demodulation reference signal; and
transmitting, by the base station, to the wireless device, in the subframe, and using the second precoding matrix, the downlink control channel, wherein the downlink control channel comprises at least one second demodulation reference signal.

44. The method of claim 43, wherein the first precoding matrix is different from the second precoding matrix.

45. The method of claim 44, wherein the second precoding matrix is a submatrix of the first precoding matrix.

46. The method of claim 43, wherein the at least one second demodulation reference signal comprises at least two orthogonal reference signals.

47. The method of claim 43, wherein the transmitting the downlink control channel employs a smaller number of antenna ports than the transmitting the downlink data channel.

48. The method of claim 43, wherein the at least one second demodulation reference signal comprises at least two orthogonal reference signals.

* * * * *

UNITED STATES PATENT AND TRADEMARK OFFICE
CERTIFICATE OF CORRECTION

| | | |
|---|---|---|
| PATENT NO. | : 9,949,265 B2 | Page 1 of 1 |
| APPLICATION NO. | : 13/887408 | |
| DATED | : April 17, 2018 | |
| INVENTOR(S) | : Dinan | |

It is certified that error appears in the above-identified patent and that said Letters Patent is hereby corrected as shown below:

On the Title Page

Item (73) Assignee, Please change "SPX FLOW TECHNOLOGY KOREA CO., LTD." to --INDUSTRIAL TECHNOLOGIES &SERVICES KOREA CO., LTD.--.

Signed and Sealed this
Twenty-sixth Day of March, 2024

Katherine Kelly Vidal
*Director of the United States Patent and Trademark Office*